United States Patent
Grabovski et al.

(10) Patent No.: US 11,126,959 B2
(45) Date of Patent: *Sep. 21, 2021

(54) SYSTEM AND METHOD FOR CONDUCTING A MULTI-CHANNEL ORDER

(71) Applicant: Walmart Apollo, LLC, Bentonville, AR (US)

(72) Inventors: Vadim Grabovski, Fayetteville, AR (US); Issa Abboud, Bentonville, AR (US); John Collier, Aventura, FL (US); Chris Venable, Jacksonville, FL (US); Craig Huber, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 124 days.

This patent is subject to a terminal disclaimer.

(21) Appl. No.: 16/536,950

(22) Filed: Aug. 9, 2019

(65) Prior Publication Data

US 2019/0370737 A1 Dec. 5, 2019

Related U.S. Application Data

(63) Continuation of application No. 15/101,379, filed as application No. PCT/US2014/067817 on Nov. 28, 2014, now Pat. No. 10,402,776.

(Continued)

(51) Int. Cl.
*G06Q 10/08* (2012.01)
*G06Q 20/20* (2012.01)
(Continued)

(52) U.S. Cl.
CPC ........... *G06Q 10/087* (2013.01); *G06Q 20/10* (2013.01); *G06Q 20/202* (2013.01);
(Continued)

(58) Field of Classification Search
CPC .. G06Q 210/087; G06Q 20/10; G06Q 20/202; G06Q 20/3224
See application file for complete search history.

(56) References Cited

U.S. PATENT DOCUMENTS 1,040,277 A1 9/2019 Grabovski
2002/0016747 A1 2/2002 Razumov
(Continued)

OTHER PUBLICATIONS

UKIPO; App. No. 1609571.3; Examination Report dated Jul. 31, 2020.

(Continued)

*Primary Examiner* — Vanel Frenel
(74) *Attorney, Agent, or Firm* — Fitch, Even, Tabin & Flannery, LLP

(57) ABSTRACT

A method for purchasing a product at a brick-and-mortar retail establishment is provided. The method includes, but is not limited to, inputting identification information into a local device for a product sold by the brick-and-mortar retail establishment, transmitting the identification information to an order creation application, and upon receiving the identification information, selecting a dispense type for the product. The dispense type is selected from a group of dispense types including: "carry" for personally carrying the product out of the brick-and-mortar retail establishment, "load" for having the product loaded into the user's vehicle, "pickup" for having the product provided to the user at a predetermined location whereby the user will go to get that product, and "delivery" for delivering the product to the user at a predetermined location.

8 Claims, 10 Drawing Sheets

Related U.S. Application Data

(60) Provisional application No. 61/910,889, filed on Dec. 2, 2013, provisional application No. 61/910,898, filed on Dec. 2, 2013, provisional application No. 61/910,906, filed on Dec. 2, 2013.

(51) Int. Cl.

| | | |
|---|---|---|
| *G06Q 20/32* | (2012.01) | |
| *G06Q 20/40* | (2012.01) | |
| *G06Q 30/02* | (2012.01) | |
| *G06Q 30/06* | (2012.01) | |
| *G06Q 20/10* | (2012.01) | |

(52) U.S. Cl.
CPC ..... *G06Q 20/3224* (2013.01); *G06Q 20/3276* (2013.01); *G06Q 20/405* (2013.01); *G06Q 30/0207* (2013.01); *G06Q 30/06* (2013.01)

(56) References Cited

U.S. PATENT DOCUMENTS

| | | |
|---|---|---|
| 2004/0138986 A1 | 7/2004 | Petrovich |
| 2006/0108419 A1 | 5/2006 | Som |
| 2008/0046331 A1 | 2/2008 | Rand |
| 2011/0238527 A1 | 9/2011 | Smith-Bauer |
| 2012/0173351 A1 | 7/2012 | Hanson |
| 2013/0173402 A1 | 7/2013 | Young |
| 2013/0211953 A1 | 8/2013 | Abraham |
| 2013/0346302 A1 | 12/2013 | Purves |

OTHER PUBLICATIONS

PCT; App. No. PCT/US2014/067817; International Preliminary Report on Patentability dated Jun. 16, 2016.

PCT; App. No. PCT/US2014/067817; International Search Report dated Mar. 6, 2015.

PCT; App. No. PCT/US2014/067817; Written Opinion dated Mar. 6, 2015.

Perez, Sarah; "It's Not Just Best Buy—Study Finds Most At-Risk Retailers From Shoppers'" "Showrooming" Behaviors Are Home, Toy and Pet Stores, TechCrunch, https:// techcrunch.com/2013/02/27/its-not-just-best-buy-study-finds-most-at-risk-retailers-from-shoppers-showrooming-behaviors-are-home-toy-and-pet-stores/, Feb. 27, 2013, pp. 1-12.

USPTO; U.S. Appl. No. 15/101,379; Notice of Allowance dated Apr. 22, 2019.

USPTO; U.S. Appl. No. 15/101,379; Office Action dated Sep. 5, 2018.

SYSTEM AND METHOD FOR CONDUCTING A MULTI-CHANNEL ORDER

This application is a continuation of U.S. application Ser. No. 15/101,379, which is a national entry application filed on Jun. 2, 2016 in accordance with 35 U.S.C. 371 and claiming priority to International Application No. PCT/US2014/067817 having an international filing date of Nov. 28, 2014, which is incorporated in its entirety herein by reference, and which claims the benefit of: U.S. Provisional Application No. 61/910,889, filed Dec. 2, 2013; U.S. Provisional Application No. 61/910,898 filed Dec. 2, 2013; and U.S. Provisional Application No. 61/910,906, filed Dec. 2, 2013; all of which are incorporated in their entirety herein by reference.

FIELD OF THE INVENTION

The present invention relates generally to purchasing products from a retail establishment. In particular, the invention relates a method for placing an order that may include multiple types of products from a retail establishment, such as in-stock products that can be fulfilled from remote locations using a mobile device, specifying methods of fulfillment and payment for each product, all within a single order.

BACKGROUND

Many retail establishments currently allow a customer to check-out and pay for products either by using a traditional cashier who scans each product and then receives tender from the customer for payment of the products, or by using a self-checkout station (SCO) in which the customer scan each product individually at that self-checkout station and then tenders payment to the self-checkout station. In some instances, a customer is allowed to scan products picked from a shelf with a local or mobile device, transferring contents of the virtual shopping cart to the point of sale register, and tender payment at the point of sale register. In either way, the customer has to shop for products by placing each product in a shopping cart, then has to take the shopping cart to either a traditional cashier or a self-checkout station, often the customer has to wait in line, and then the customer has to remove each product from the shopping cart so that the traditional cashier or a self-checkout station can scan identification information from the product, such as a barcode, and then typically each product is then placed back in the shopping cart or into a shopping bag upon scanning.

As a result of this process, retail establishments have in invest in cashiers or self-checkout stations and additional time is required from the customer to complete his purchase by having to go to a cashier or a self-checkout station. It would be desirable to provide a customer and a retail establishment with a method for purchasing products from the retail establishment which provided the customer with a variety of payment methods and a variety of delivery or fulfillment options.

Furthermore, many consumers visit a brick-and-mortar retail establishment only to get their hands on products they may be interested in purchasing, then compare prices of those products to the prices of online retail establishments, and purchase the products from a competitor's online retail establishment conveniently using a portable computing device, such a smart phone or a tablet instead of going through a traditional point of sale terminal at the brick-and-mortar retail establishment they are visiting. As a result of this practice, which is called showrooming, brick-and-mortar retail establishments end up losing revenue due to lost sales to online retail establishments.

Additionally, many products may not be available at a brick-and-mortar retail establishment, as the size of the brick-and-mortar retail establishment is limited. Additionally, some products are too expensive, heavy, or large to be stocked on a shopping floor of a brick-and-mortar retail establishment. Online retailers have many advantages over brick-and-mortar retail establishment in that they may stock larger merchandize assortments. Furthermore, online retailers offer a variety of delivery and payment options, however most of them do not accept payments in cash. It would be desirable to provide a customer at a brick-and-mortar retail establishment with a method for purchasing products which match or exceed the convenience and selection of an online retail establishment.

SUMMARY

In one aspect, a method for purchasing a product at a brick-and-mortar retail establishment is provided. The method includes, but is not limited to, inputting identification information into a local device for a product sold by the brick-and-mortar retail establishment, transmitting the identification information to an order creation application, and upon receiving the identification information, selecting a dispense type for the product. The dispense type is selected from a group of dispense types including: "carry" for personally carrying the product out of the brick-and-mortar retail establishment, "loud" for having the product loaded into the user's vehicle, "pickup" for having the product provided to the user at a predetermined location whereby the user will go to get that product, and "delivery" for delivering the product to the user at a predetermined location.

In one aspect, a method for purchasing a product is provided. The method includes, but is not limited to, placing a product in a virtual shopping cart of an order creation application and selecting a dispense type for the product. The dispense type is selected from a group of dispense types including: "carry" for personally carrying the product out of the brick-and-mortar retail establishment, "load" for having the product loaded into the user's vehicle, "pickup" for having the product provided to the user at a predetermined location whereby the user will go to get that product, and "delivery" for delivering the product to the user at a predetermined location.

In one aspect, a system for purchasing one or more local inaccessible products is provided. The system includes, but is not limited to, a local device for retrieving identification information for a product, a remote server connected with the local device, wherein the remote server receives the identification information, an order management system connected with the remote server, wherein the order management system processes an order for the local inaccessible product, and an order fulfillment system connected with the order management system to fulfill the order in accordance with the selected dispense type. The remote device is in communication with a product database which contains product information for the product. The remote server uses the identification information to retrieve the product information. Product information related to the product is communicated to an order creation application which places the product in a virtual shopping cart along with some of the product information. A dispense type is selected for the product from a group of dispense types including: "carry"

for personally carrying the product out of the brick-and-mortar retail establishment, "load" for having the product loaded into the user's vehicle, "pickup" for having the product provided to the user at a predetermined location whereby the user will go to get that product, and "delivery" for delivering the product to the user at a predetermined location.

The scope of the present invention is defined solely by the appended claims and is not affected by the statements within this summary.

In one aspect, a method for purchasing an item using a mobile device is provided. The method includes, but is not limited to, . . . .

In one aspect, a computer readable memory medium comprising program . . . .

In one aspect, a method for purchasing an item . . . .

The scope of the present invention is defined solely by the appended claims and is not affected by the statements within this summary.

In one aspect, a method for purchasing a product at a retail establishment is provided. The method includes, but is not limited to, creating a virtual shopping cart with an order creation application, selecting an order fulfillment method for each product in the virtual shopping cart from a group of order fulfillment methods, and selecting a payment method for each product in the virtual shopping cart from a group of payment methods. The group of order fulfillment methods includes: delivering a product within the order to a user specified location, making a product within the order available for later pick up, personally carrying a product within the order out of a retail establishment, arranging for recurring delivery of a product within the order to a user specified location, or retrieving a local inaccessible product within the order from storage and delivering the local inaccessible product to a loading location. The virtual shopping cart includes product information related to two or more different products sold by the retail establishment. Each product is a different product type selected from a group of product typo including: a local accessible product, a local inaccessible product, an online product, and a remote product.

In one aspect, a method for purchasing a product is provided. The method includes, but is not limited to, providing identification information for two or more different products sold by a retail establishment, creating a virtual shopping cart with an order creation application, selecting a dispense method for each product in the virtual shopping cart from a group of dispense methods, and selecting an order fulfillment method for each product in the virtual shopping cart from a group of order fulfillment methods. Each product is a different product type selected from a group of product types including: a local accessible product, a local inaccessible product, an online product, and a remote product. The virtual shopping cart includes product information related to the two or more different products sold by the retail establishment. The group of dispense methods includes: "delivery," "pick-up," "carry," and "load". The group of order fulfillment methods includes: delivering a product within the order to a user specified location, making a product within the order available for later pick up, personally carrying a product within the order out of a retail establishment, arranging for recurring delivery of a product within the order to a user specified location, or retrieving a local inaccessible product within the order from storage and delivering the local inaccessible product to a loading location.

In one aspect, a system for purchasing a product is provided. The system includes, but is not limited to, a local device for retrieving identification information for two or more different products sold by a retail establishment, a remote server connected with the local device, an order management system connected with the remote server, and an order fulfillment system connected with the order management system to fulfill the order. The order management system processes an order for the product. Each product is a different product type selected from a group of product types including: a local accessible product, a local inaccessible product, an online product, and a remote product. Upon receiving the identification information at the local device, the local device automatically forwards the identification information to an order creation application. The order creation application adds the products to a virtual shopping cart. At least one order fulfillment method for the products in the virtual shopping cart is selected from a group of order fulfillment methods including: delivering a product within the order to a user specified location, making a product within the order available for later pick up, personally carrying a product within the order out of a retail establishment, arranging for recurring delivery of a product within the order to a user specified location, or retrieving a local inaccessible product within the order from storage and delivering the local accessible product to a loading location.

The scope of the present invention is defined solely by the appended claims and is not affected by the statements within tins summary.

BRIEF DESCRIPTION OF THE DRAWINGS

The invention can be better understood with reference to the following drawings and description. The components in the figures are not necessarily to scale, emphasis instead being placed upon illustrating the principles of the invention.

FIGS. 3A and 3B through 8 depict flowchart illustrations of methods, apparatus (systems) and computer program products, in accordance with one embodiment of the present invention.

DETAILED DESCRIPTION

The present invention makes use of the discovery that by using a local or mobile device with identification information input capabilities and communications capabilities, a user can input identification information into the local device which identifies a variety of products for purchase, some of which are not on a floor of a brick-and-mortar retail establishment, generate an order for the product identified by the identification information, pay for the order using one of a variety of different payment methods, pay for the entire order using a single transaction regardless of whether the order includes local accessible products or not, and fulfill the order in one of a variety of different manners. In this way, a user or customer at a brick-and-mortar retail establishment is provided with a method for purchasing products which matches or exceeds the convenience and selection of an online retail establishment.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

Figure 1A:
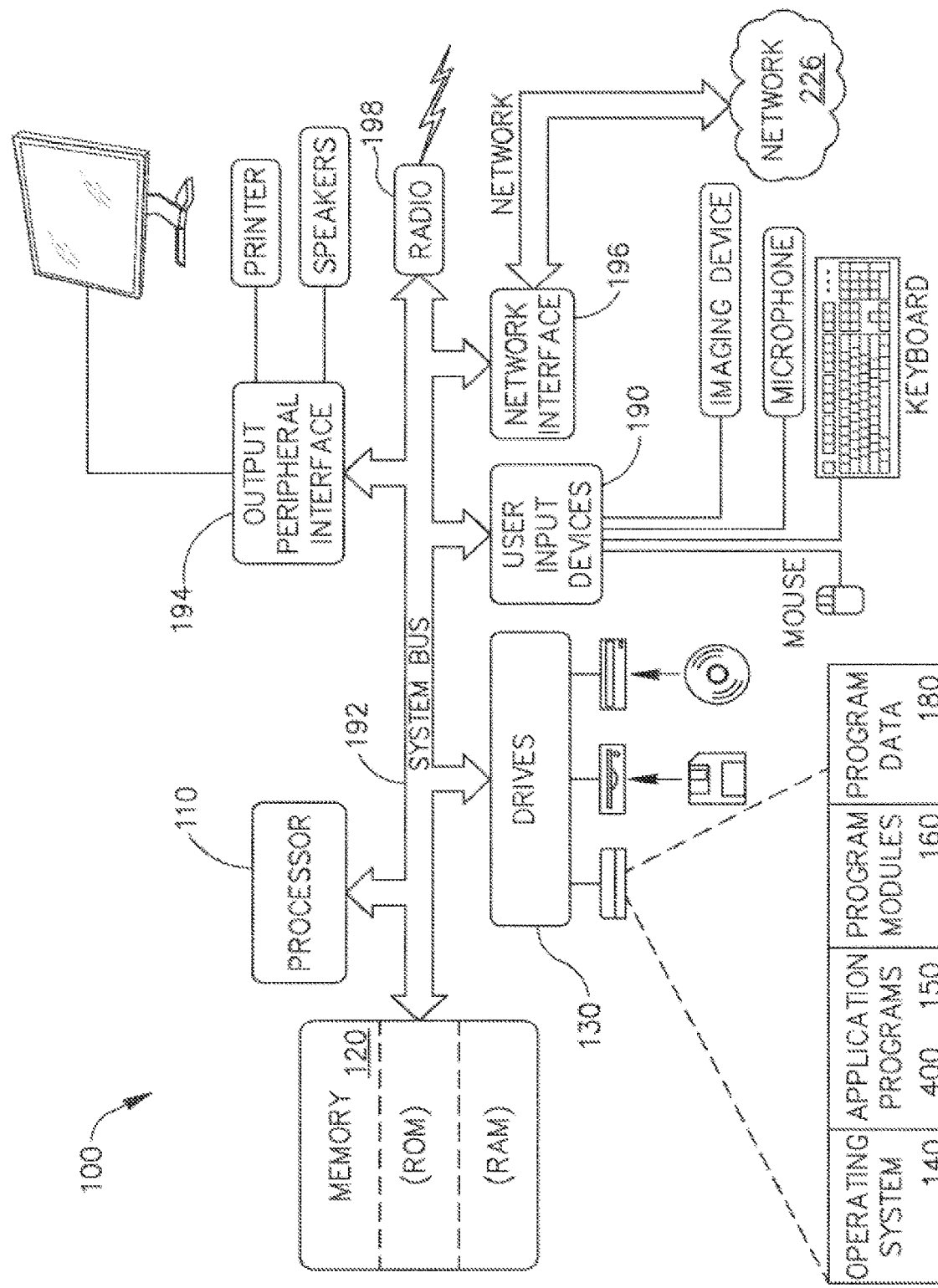
FIG. 1A depicts a block schematic diagram of an exemplary computing system, in accordance with one embodiment of the present invention.

With reference to FIG. 1A, depicted is an exemplary computing system for implementing embodiments. FIG. 1 includes a computer 100, which could be any one of a local or mobile device 200 or remote server 240. Computer 100 may be a local or mobile device, wherein at least some or all of its components are formed together in a single device which can be carried around by a person or a local device which is accessible by a user, such as an automobile touch-screen computer or a local kiosk, and which may or may not be carried around by a person. A local device may comprise a mobile device. The computer 100 includes a processor 110, memory 120 and one or more drives 130. The drives 130 and their associated computer readable memory medium provide storage of computer readable instructions, data structures, program modules and other data for the computer 100. Drives 130 can include on operating system 140, application programs 150 such as order creation application 400, program modules 160, and program data 180. Computer 100 further includes input devices 190 through which data may enter the computer 100, either automatically or by a user who enters commands and data. Input devices 190 can include an electronic digitizer, an image scanner, a barcode reader, a microphone, a camera, a video camera, a keyboard and a pointing device, commonly referred to as a mouse, a trackball or a touch pad, a pinpad, any USB device, any Bluetooth enabled device, an RFID or NFC device, and a debit card reader. Other input devices may include a joystick, game pad, satellite dish, scanner, and the like. In one or more embodiments, input devices 190 are portable devices that can direct display or instantiation of applications running on processor 110.

These and other input devices 190 can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers, printers, and/or display devices, which may be connected through an output peripheral interface 194 and the like.

Computer 100 also includes a radio 198 or other type of communications device for wirelessly transmitting and receiving data for the computer 100 with the aid of an antenna. Radio 198 may wirelessly transmit and receive data using WiMAX™, 802.11a/b/g/n, Bluetooth™, 2G, 2.5G, 3G, and 4G, wireless standards.

Computer 100 may operate in a networked environment using logical connections to one or more remote computers, such as a remote server 240. The remote server 240 may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note, however, that source and destination machines need not be connected by a network or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as radio 198, to environments such as the Internet. It will be appreciated that other means of establishing a communications link between computer 100 and other computers may be used.

Figure 1B:
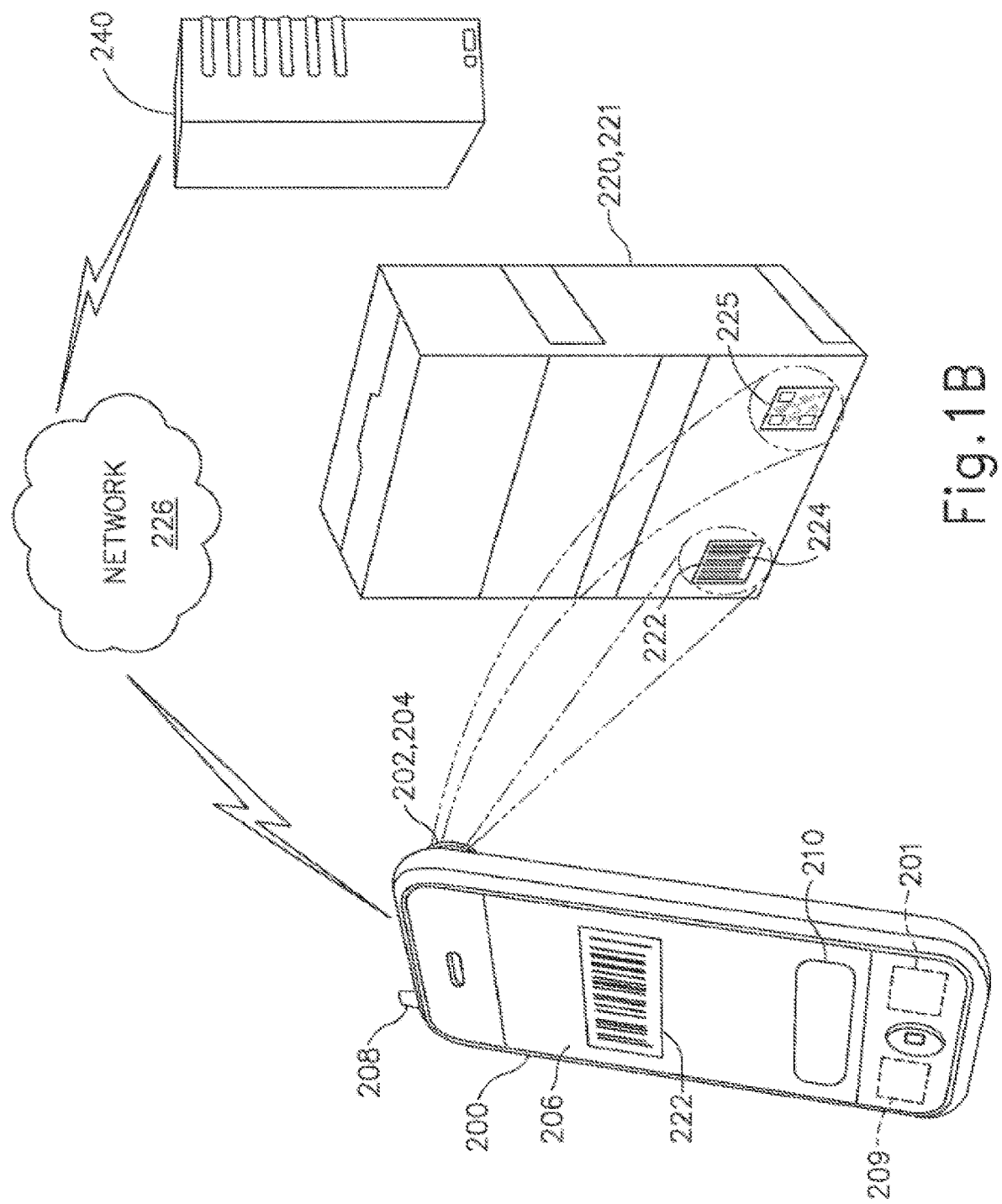
FIG. 1B depicts an illustration of a local or mobile device receiving identification information from a product and communicating with a remote server, in accordance with one embodiment of the present invention.

With reference to FIG. 1B, illustrated is an exemplary representation of a local or mobile device 200 for purchasing a product 220 from a retailer at a retail establishment. As used herein, the term "product" or "product 220" refers to any item or service sold by a retail establishment. "Item" include tangible objects or computer software which may be fixed in a tangible medium that may be purchased from a retail establishment. "Service" includes non-tangible objects or useful labor that does not produce a tangible commodity that may be purchased from a retail establishment.

Local or mobile device 200 includes any local or portable electronic device having a processor 201 for executing applications and a display 206 for displaying information connected with the processor 201, and includes such devices as a personal desktop assistant (PDA), a portable computer, a mobile telephone, a smartphone, a netbook, a mobile vehicular computer, a tablet computer, a kiosk, a handheld scanner, or a point of sale terminal. Display 206 can use any of a variety of types of display technologies, such as a liquid crystal display (LCD), a cathode-ray tube type display, an electronic ink display, a light emitting diode (LED) type display such as an OLED display, and a plasma display. Preferably, the local device 200 also includes a communications device 208 and a scanning module 202. The communications device 208 is connected with the processor 201 and capable of sending and receiving information between one or more other computers connected with the local device 200. Preferably, communications device 208 is capable of wirelessly transmitting signals to another computer, such as remote server 240, using a radio transmitter and a radio receiver connected with an antenna. The scanning module 202 is capable of receiving identification information 222 from a product 220 and converting the identification information 222 into a format that the processor 201 can read, such as digital data. Preferably, scanning module 202 includes any device which can capture, receive and process information, near-field communication (NFC) sensor, such as a Quick Response (QR) code, a barcode or any image, and includes devices such as a digital scanner, a digital camera, a video camera, a barcode reader, and any other type of digital or analog imaging device.

Preferably, communications device 208 communicates with another computer 100, such as remote server 240, via a network 226 using a network interface 209. Network interface 209 is connected with processor 201 and communications device 208, and preferably disposed within remote device 200.

Network 226 may include any type of network that is capable of sending and receiving communication signals, including signals for multimedia content, images, data and streaming video. Network 226 may include a data network, such as the Internet, on intranet, a local area network (LAN), a wide area network (WAN), a cable network, and other like systems that are capable of transmitting information, such as digital data, and the like. Network 226 may also include a telecommunications network, such as a local telephone network, long distance telephone network, cellular telephone network, satellite communications network, cable television network and other like communications systems that interact with computer systems to enable transmission of information between local device 200 and another computer such as remote server 240. Network 226 may include more than one network and may include a plurality of different types of networks. Thus, network 226 may include a plurality of data networks, a plurality of telecommunications networks, cable system, satellite systems and/or a combination of data and telecommunications networks and other like communication systems.

Network 226 is connected with both local device 200 and remote server 240 and allows for information to be transmitted and shared between local device 200 and remote server 240. Remote server 240 includes any type of computer which can receive, store, process, and transmit information to another computer and includes devices such as a server based computer system capable of interacting with one or more other computer systems.

In one embodiment, local device 200 includes location information processing means which allows the local device 200 to determine its location. Location information processing means includes devices such a Global Positioning System (GPS) based device, and others methods such as using radio triangulation via Wi-Fi or Bluetooth™ to determine the location of the local device 200. Preferably, local device 200 includes input means 210 for entering information from a user into the local device 200. Input means includes any device which can assist a user to enter information, such as a keyboard, a mouse, a touchpad, a touchscreen, a joystick, a button, and a dial.

Product 220 includes any item or service which is being sold by a retail establishment. Product 220 includes any "item" such as any tangible object or physical merchandise being sold by a retail establishment, which may be located in the brick-and-mortar retail establishment, in another brick-and-mortar retail establishment, or online at a remote warehouse. Product 220 may also include any "service" provided or sold by a retail establishment, either locally which may be located in the brick-and-mortar retail establishment, or remote from the brick-and-mortar retail establishment. "Item" include tangible objects or computer software which may be fixed in a tangible medium that may be purchased from a retail establishment. "Service" includes non-tangible objects or useful labor that does not produce a tangible commodity that may be purchased from a retail establishment.

Items, for example, include such things as groceries, software, electronic devices, tools, hardware, clothing, housewares, jewelry, and furniture. Services, for example, include such things as an extended warranty service, gift wrapping, discounts, coupons, layaway services, installation of an item, payment of a bill, and creating a money order. Products 220 that can be added to the order include, for example: extended services—warranty, gift wrapping; coupons, by scanning or using electronic coupons that are available on-line or linked to a user's account; personal discounts, like associate discount that can be read from the discount card or linked to the customer's account; layaway items for which a layaway order is created; payment towards a layaway order; installation of the item or product; weighted items such as groceries; a utility bill payment; a money order; items from a marketplace.

A retail establishment may be either an online retail establishment which conduct business through the internet or a brick-and-mortar retail establishment which conduct business through a physical store or warehouse. A retail establishment includes a supermarket, a general retail store, a wholesale store, a charity organization, a restaurant, or any other place which sells goods or services. The term "retail establishment" also includes a retail establishment's agents, such as any third party associated with the retail establishment or working in conjunction with the retail establishment. For example, a third party could be a delivery company working in conjunction with the retail establishment or a company that provides a service to the user or consumer through the retail establishment. For example, the retail establishment could sell a third party's carwash service or oil change service through the order creation application 400.

Preferably, the product 220 is located within a brick-and-mortar retail establishment or accessible by the brick-and-mortar retail establishment. Product 220 preferably includes identification information 222 which is any information on or about the product 220 which assists in identifying the product 220. Identification information 222 is preferably entered into order creation application 400 using one of a variety of methods, such as, scanning, manual entry, or selection from an on-line or locally based catalogue. Scanning the identification information 222 uses either ran input device 190 or scanning module 202 to enter identification information 222 from a locally accessible product 220. Manual entry of the identification information 222 would include entering the identification information 222 manually by the user. Selection from an on-line or locally based catalogue would require the user to manually select the product 220, and its corresponding identification information 222, from a catalogue presented to the user via order creation application 400.

Preferably, the identification information 222 includes a product identification code that is preferably encoded within a product identification device 223. The product identification device 223 may be a sticker, label, an NFC sensor, an RFID device, or any wireless device which transmits and/or receives a signal, which is placed on or near the product 220. The product identification code includes any information, such as a code or pattern, which may be displayed, broadcast, or digitally encoded, such as a digitally encoded optical pattern like a QR Code 225 or UPC code/barcode 224, a UPC number or product code 227 or other retail product identification, illustrations or images 229 of or on the product 220, a wireless code which can be transmitted wirelessly such as an RFID or NFC code 233, or any digitally encoded information 231 which can contain identification information 222 used to identify the product 220. In one embodiment, the identification information 222 includes a website address, such as a website address containing information about the product. Preferably, identification information 222 is an automatically or manually entered product identification which may include a product identification code, an optically recognizable image, or a radio frequency readable code, and may be retrieved from identification device 223 by optically scanning or using radio frequencies. In one embodiment, the identification information 222 is an image of the product. The image of the product 220 is captured with a camera, preferably a camera of a local device, or by importing or downloading an image from another source, such as an image from a web site. Preferably, the image is processed through an image recognition software that identifies the product 220 and provide a product identification code, such as an alphanumeric code, which represent the product 220.

The product identification code is then sent to the order creation application 400 which uses the product identification code to recognize a product. The order creation application 400 is an application which assist in the shopping process. The order creation application 400 assist in entering and receiving a product identification code for a product 220 and then creating a virtual shopping cart for placing identifying information about the product 220 in, and then helps to create an order for all products 220 in the virtual shopping cart. The order creation application 400 is run on a computer 100, such as remote server 240 or on the local device 200.

Preferably, the identification information 222 includes information which identifies the product 220, such as a serial number, a name of the product 220, and any text, characters, or images used to identity the product 220, a product code or number, and any information 280 which links to a website which identifies the product 220, such as a website address. While identification information 222 may be on or near the product 220, identification information 222 may be on or near a variety of different mediums, such as a publically accessible medium as described herein.

Figure 2:
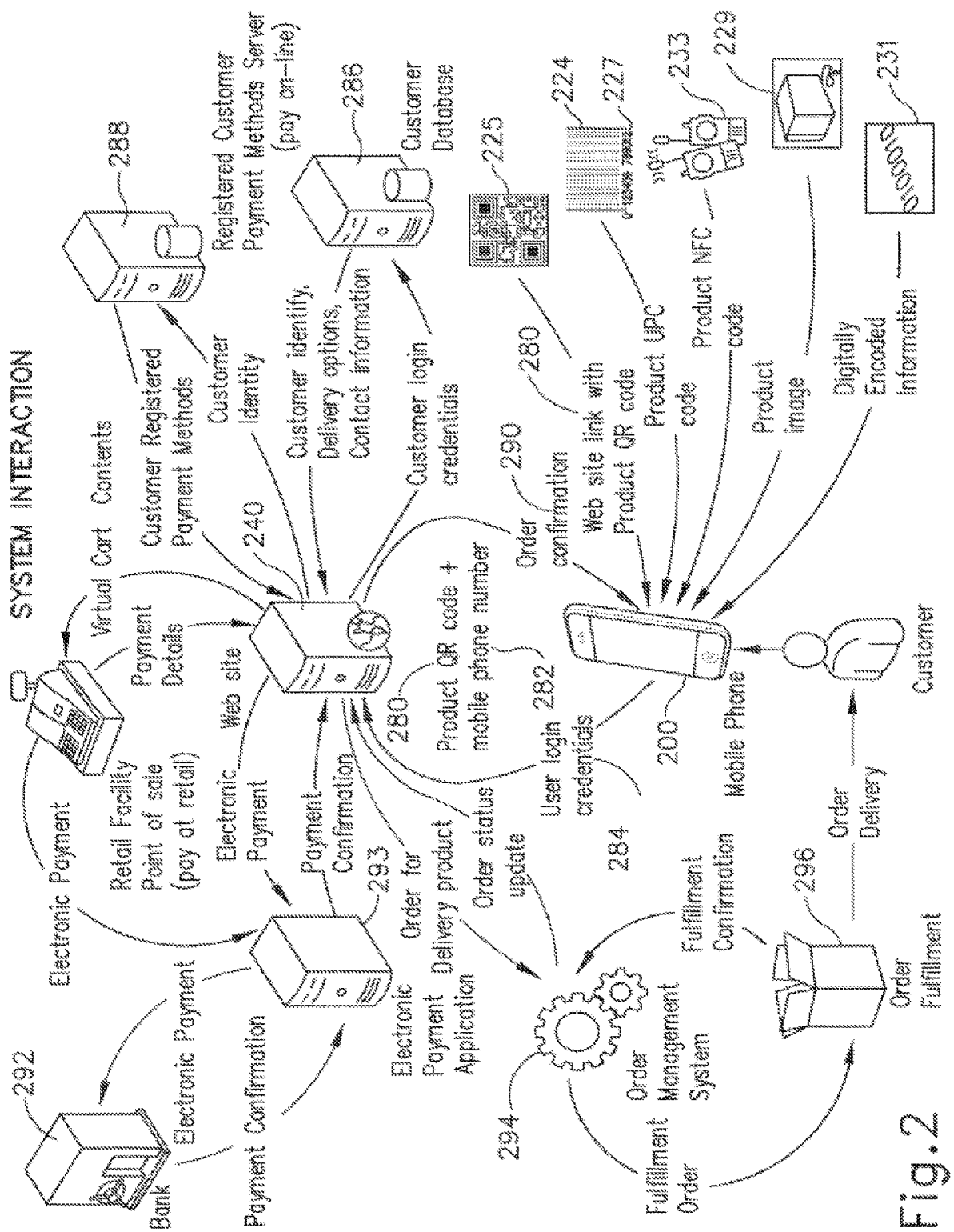
FIG. 2 depicts a system level flowchart of interactions between a customer, a local or mobile device, and a remote server, in accordance with one embodiment of the present invention.

With reference to FIG. 2, in operation, the local device 200 or a user using the local device 200 retrieves identification information 222 onto the local device 200. Preferably, the local device 200 is brought near to identification device 223, and identification information 222 is retrieved from the identification device 223 by the local device 200. For example, in one embodiment, the local device 200 may be brought near a QR code 225, and an image of the QR code 225 is captured by the local device 200. In another embodiment, the local device 200 may be brought near an NFC sensor and identification information 222 is retrieved from the NFC sensor onto the local device 200.

Identification information 222, and identification device 223, may be situated in one of a variety of spots, such as on or near a product 220 located within a brick-and-mortar retail establishment or store. Additionally, identification information 222, and identification device 223, may be situated on a publically accessible medium such as in an advertisement, like an advertisement on a billboard or magazine, or situated on a publically accessible medium such as a product display, like a display within a shopping mall or a brick-and-mortar retail establishment. A publically accessible medium is any medium on which information regarding a product may be provided to a user, and which is accessible by the public. A publically accessible medium may include an advertisement or product information which is on a billboard, in a magazine or newspaper, on the internet or an ordering website such as an online catalog, on television, in a movie, on a poster, on a product display, on a stand or shelf label near a product, an image file, or on a product. The publically accessible medium is preferably in a location which is accessible by the public, such as a street, a mall, a storefront, or a store.

In one embodiment, the identification information 222 is captured by the local device 200, preferably at the direction of the user, and then communicated along with a unique identifier 282 to an order creation application 400. Upon entering identification information 222, order creation application 400 may request scanning of the product's serial number and may request validation of sale restrictions (i.e. age, permits, recall). A user may lookup products that are not available at the store by inputting or scanning identification information 222 from some medium or visiting an online catalog using the local or mobile device 200. The online catalog may be displayed in reference to the scanned information 222 and contain products that are not stocked or located at the brick-and-mortar retail establishment for better assortment choices.

In one embodiment, the identification information 222 includes and then provides the local device 200 with information 280, which preferably links to a website or website address. Information 280 provides a link to more information about product 220, such as a link to a website which contains reviews, product information, purchasing information, pricing information, and availability information for product 220. Information 280 preferably causes the local device 200 to access or launch a website from the remote server 240. The website contains more information about the product 220, and preferably the website is in communication with an order creation application 400 which is used to purchase the product 220 from a current retail establishment which is linked to the website or the order creation application 400. Preferably, the order creation application 400 runs on the website or on the local device 200. In one embodiment, the information 280 causes the order creation application 400 to open and automatically place the product 220 in a virtual shopping cart of the order creation application 400 for purchase by the user from the current retail establishment. In one embodiment, identification information 222 is derived from a QR Quick Response (QR) code, a barcode, or an product's model number or serial number.

Preferably, the order creation application 400 includes a scan button for scanning additional identification information 222, a view cart button for viewing the contents of the virtual shopping cart, and a home button for going back to the home screen. When selected, the scan button activates a scanning module and presents the user with a scan screen which allows the user to capture and input identification information 222 from a product 220, either manually or automatically using the local device 200. When selected, the view cart button presents the user with a shopping cart screen which allows the user to view the contents of the virtual shopping cart created by the user and which contains information regarding the product 220. When selected, the home button returns the user to the home screen.

The virtual shopping cart is associated with an order. As used herein, an order is any request to purchase a product 220. The order is comprised of information received from the order creation application 400, such as identification information 222, quantity information indicating how many units of a particular product 220 in the virtual shopping cart a user would like to purchase, user identification information, additional user information, an order number, and store identifying information which provides information that identifies the specific retail establishment in which the user is in.

Preferably, the local device 200 transmits a user identifying information, such as a unique identifier 282, along with identification information 222, to the order creation application 400. The unique identifier 282 includes any information which can uniquely identify the user, such as a mobile phone number, a mobile IMEI number, a user's account name, a user's government ID, or other such information. At that point, the order creation application 400 then preferably sends the local device 200 through the remote server 240 a request for user login credentials 284. The user login credentials 284 is some additional information from the user which helps to uniquely identify the user, such as a password. Sometimes the user login credentials 284 are saved by the application 400 and no request for user login credentials 284 is made.

Upon receiving the user login credentials 284, the order creation application 400 then prompts the remote server 240 to access the user's personal information, which may be stored remotely at a customer database 286, and the user's registered payment method information which may be stored remotely at a customer payment methods server 288. The user's personal information may include the user's identity, name, address, delivery options, contact information, and personal preferences. The user's payment method information may include information regarding any one of the user's registered payment methods associated with the user's account, such as a PayPal™ account or other online payment account information, credit, debit, money, government benefit, or gift card information, bank account information, and any other information related to a financial payment method which can be used to provide authorization of funds to purchase the product 220. Additionally, the user may provide payment method information for a new payment method before payment for the order is authorized. The user may provide a payment method either by keying in a new payment method or scanning new payment information from a medium, such as a credit card. The payment method include any of a variety of different payment methods, such as credit card payment, debit card payment, money order payment, check payment, cash payment, government benefit payment (i.e. food stamps), gift card payment, travelers check payment, or online account payment such as a PayPal™ account or other online account. The payment method may be made using any one of a variety of payment channels including: electronic or mobile payment using a local device 200, payment via a kiosk, and payment via a point of sale terminal.

Remote server 240 may also be connected with a product database which contains product information such as product descriptions, product illustrations and images, and product pricing and sales information. The remote server 240 communicates the product information from the product database to the order creation application 400. Preferably, the remote server 240 received identification information 222 from the local device 200 and uses the identification information 222 to retrieve product information related to the product 220 for whom the identification information 222 was input for, and then communicates the product information to the order creation application 400. Preferably, the order creation application 400 then places the product 220 in a virtual shopping cart along with some of the product information.

In one embodiment, the customer database 286 provides a customer identification token that can be used to obtain additional secure information about the customer from various information systems that recognize the customer identification token as a valid method for customer identification. In one embodiment, the customer identification token is used to obtain preregistered methods of payment from a remote service, such as a customer payment methods server, upon receiving the customer identification token from a customer database 286.

Upon automatically placing the product 220 in a virtual shopping cart of the order creation application 400 for purchase by the user, the user may update a quantity of the product 220 within the order by making additional scans of the same product 220 or specifying an exact number of products 220 by entering information using a local device key entry system, such as a keyboard or touchscreen. In one embodiment, additional products 220 may be placed in the virtual shopping cart of the order creation application 400 by scanning additional identification information of each additional product 220 thereby automatically adding each additional product 220 to the order. Furthermore, in one embodiment, products 220 may be deleted from the order by scanning identification information 222 of each product 220 which the user wishes to delete from the order, thereby automatically deleting the product 220 from the order.

In one embodiment, identification information 222 may be scanned or input for a product 220 which is out of stock. In one embodiment, the order creation application may indicate that the product 220 is out of stock, on back order, or in a different location, such as in a different brick-and-mortar retail establishment or online. In this instance, the user has the option of creating a back order for the product 220 if the product 220 is out of stock. The user also has the option of purchasing the product 220 from a different location.

Products 220 which are added to or deleted from the order may be added or deleted in one of a number of ways, such as by scanning identification information 222 with the local device 200, entering identification information 222 manually using a device key entry system, such as a keyboard, touchscreen, or other input peripheral, or by electing a product shown within a menu or screen of the order creation application 400.

Products 220 which are added to or deleted from the order may be one of the following product types: local accessible products located in the brick-and-mortar retail establishment in which the user is located and which may be physically accessed by the user and placed into a shopping cart; local inaccessible products 221 which are located in the brick-and-mortar retail establishment but are either too large or too heavy to be located on the showroom floor, too expensive to be accessible by the user, or not provided on the showroom floor; remote products which are located in another brick-and-mortar retail establishment which is remote from the user; and online products which are not located in the brick-and-mortar retail establishment in which the user is located. Inaccessible products typically require the assistance of store personnel to retrieve the product 220 and deliver an item or provide a service to the user as they are often in a secure location, or in a location within the brick-and-mortar retail establishment which is inaccessible to the user. Remote products are located in another brick-and-mortar retail establish, and not the brick-and-mortar retail establishment in which the user is located. Online products are located remote from the brick-and-mortar retail establishment, such as on a remote server or in a remote warehouse which is not a brick-and-mortar retail establishment. Some products 220, such as some services (i.e. warranties and installations) usually do not require "retrieval", but rather activation, registration or initiation with the service providers. This may be done once payment is processed.

The user has the option of adding local accessible products, local inaccessible products 221, remote products, and online products to the order via the order creation application 400 in any one of a number of ways, such as by scanning identification information 222 with the local device 200, entering identification information 222 manually into the local device 200, or by selecting a product shown within a menu or screen of the order creation application 400. As a result, the user has great flexibility in how to add products 220 to an order and which products 220 may be added to an order. For example, the user may scan identification information 222 from a display for a remote product or online product which is not in the brick-and-mortar retail establishment in which the user is located, and that product 220 may be added to the order within the order creation application 400.

Upon adding any one of a variety of products 220 to the order creation application 400, preferably, the amount of the order is calculated and determined based on, but not limited to product prices, taxes, sale promotions, discounts, rebates, coupons, fees (delivery, installation, warranty), local charges, deposit fees. Upon calculating the amount of the order, the user is then prompted to select a payment method. The payment method is either a registered payment methods associated with the user's account or a new payment method which may be entered in real time by the user before payment for the order is authorized. The payment method may also include payment at a traditional point of sale terminal, or an electronic payment which bypassed the traditional point of sale terminal and is made through the order creation application 400. Additionally, a different payment method may be selected by the user for each product 220 within the order using the order creation application 400. As a result, some products 220 may be paid for by using a point of sale terminal and other products 220 may be paid electronically through the order creation application 400 by using a preregistered or newly entered payment method, such as PayPal™. In one embodiment, total order payment may be split between different payment methods that is not linked to specific products 220, but rather on a percentage of a total or based on fixed amounts, as long as products 220 are paid in accordance to the rules (i.e. non-grocery products should not be paid with a food stamps card).

Upon selecting a payment method, an order sale recording application or system documents a sale of the order, such as the transfer of ownership and removal of a product from the retail establishment's inventory. For each order, single payment amount is calculated, one which may be fulfilled using one or more of a variety of fulfillment methods, and one which may be paid using one or more of a variety of payment methods.

In one embodiment, payment is completed for the order via a payment processing application that is connected to a financial institution, wherein the order creation application 400 provides payment information to the payment processing application which in turn sends payment information to the financial institution and receives authorization information from the financial institution.

In one embodiment, payment may be authorized for only products 220 which are carried out of the brick-and-mortar retail establishment by the user and for products that do not require fulfillment, such as warranties, fees, or other charges. For the products 220 that will be fulfilled at a later date, pre-authorization may be made so that a payment will be authorized at a later date once the order is fulfilled.

In one embodiment, the order is transferred along with a selected payment method or methods and order fulfillment method preferences to a payment processing application, preferably connected with a point of sale terminal. The payment processing application does not have to reside at the retail brick-and-mortar retail establishment, it may be a centralized capability. Preferably, the payment processing is not responsible for calculation of a total. Preferably, the total is calculated by the order management system. Acceptance of payment via the payment processing application may be completed at a point of side terminal. Upon transferring the order, a payment confirmation is sent by the payment processing application to the order creation application 400. Then the sale is documented by the payment processing application which also initiates removal of a product from a retailer's inventory for those products 220 that are carried out or services purchased by the customer. The payment processing application is preferably located on an electronic device server which resides in the brick-and-mortar retail establishment and which receives a method of payment, which calculates an order total, and which contacts a financial institution to authorize payment, and which makes an entry showing products 220 have been sold. Preferably, a proof of purchase is generated and provided to the customer in a form that is not limited to a paper receipt printed on a store point of sale register, an electronic copy or on-line reference delivered to the customer's electronic account, or a facsimile delivered to a customer's fax machine.

Payment for the order can be obtained at a point of sale terminal where all types of payment are accepted, including cash, check, electronic cards, EBT cards, vouchers or other cash equivalents. Funds for the payment of the order may be obtained at different times, depending on method of dispense, and when the product 220 has been fulfilled. The order creation process may include creation of a layaway order, applying payment to the layaway order, creation of a money order and money transfer, and creation of a home delivery and an installation order. A payment settlement process may include sending payment to a third party fulfillment company such a direct shipping vendor, third party fulfillment centers, a utility company, a processor of a money order or a money transfer, sending coupons or rewards to the manufacturer for reimbursement, and payment to the provider of home delivery and of an installation order. A payment settlement process typically occurs after payment is received.

In addition to a payment method, the user is prompted to select an order fulfillment method. Preferably, the order fulfillment method is a preregistered method associated with the user's account, however, the order fulfillment method may be a new method which is manually entered by the user via the local device 200 into the order creation application 400. Upon selecting the order fulfillment method, an order fulfillment selection indicating the selected order fulfillment method is communicated to an order fulfillment system 296, which then receives the order fulfillment selection from the order creation application 400. The order fulfillment selection provides an order fulfillment method to the order fulfillment system 296. The order fulfillment method includes any one of a number of methods, such as delivering a product 220 within the order to a user specified location, making a product 220 within the order available for later pick up at the brick-and-mortar retail establishment, personally carrying a product within the order out of the brick-and-mortar retail establishment, arranging for recurring delivery of a product 220 within the order to a user specified location, or retrieving a local inaccessible product 221 within the order from a storage location within the brick-and-mortar retail establishment and delivering the local inaccessible product 221 to a loading location. Products 220 which are part of an order, but which have different order fulfillment methods, may be split into separate fulfillment orders depending on the method of delivery and fulfillment.

Preferably, the loading location is at or near the brick-and-mortar retail establishment such as a loading dock of the brick-and-mortar retail establishment. The order fulfilment method may also include specifying a pre-designated time for picking up an order or a product within the order. In one embodiment, the user specified location is entered by the user by keying in a location into the local device 200, providing location information to the local device 200 from another device, or by scanning location information from a medium, such as a display, into the local device 200.

In one embodiment, upon selection of an order fulfillment method, the order fulfillment system 296 delivers a product to the user according to a selected order fulfillment method, selected on the order creation application 400. In one embodiment, the user may select a recurring delivery option for a product 220 in the order on the order creation application 400. In one embodiment, the order includes a plurality of products, and wherein for at least two products a different order fulfillment method is selected by the user. In one embodiment, for each product in the order, a different order fulfillment method may be selected or entered in by the user. In one embodiment, the fulfillment system 296 transmits instructions to retrieve a local inaccessible product 221 from storage and load the product 221 onto a designated vehicle at a designated loading location.

Upon selecting the order fulfillment method, the user is then prompted to provide an order confirmation in order to authorize payment for the order by the order creation application 400. Upon receiving the request for an order confirmation, the user then confirms the order or may return back into the shopping mode.

Preferably, either the user communicates to the order creation application 400 using the local device 200 to make a payment for the order electronically using or the order creation application 400 transfers the order to a point of sale register for payment and the collection of funds. In one embodiment, either just before or just after confirming the order, but before authorizing payment, the order is transferred along with a selected payment method or methods and/or order fulfillment preference or preferences to a retail point of sale terminal. The point of sale terminal then receives an acceptance or authorization of payment from a financial institution associated with the user's payment method. Preferably, the point of sale terminal does not communicate directly with the financial institution, but rather, the point of sale terminal has to go through an electronic payment application, or hub of some kind, that dispatches payment info to the proper channel based on the payment type (i.e. Discover network or other credit card network, EBT payment, etc.). Upon receiving an authorization of payment, the point of sale terminal may then communicate and send a payment confirmation to the order creation application 400.

In one embodiment, upon being prompted to provide an order confirmation, and upon the user confirming the order, an on-line payment is completed via the order creation application 400. In this embodiment, the order creation application 400 is connected to a financial institution, wherein the order creation application provides payment information to the financial institution and receives authorization information from the financial institution to authorize payment for or reserve funds for purchasing the product 220 and pay for the order.

Upon receiving the order confirmation from the local device 200, either the order creation application 400 or the point of sale terminal generates an order and then contacts a financial institution 292, such as a bank, to authorize payment for or reserve funds for purchasing the product 220. Upon authorizing payment or reserving funds, an order management system 294 is contacted, preferably by the either the order creation application 400, to process the order and an order fulfillment system 296 to fulfill the order by obtaining and delivering the product 220 to the user. Order fulfillment preferences are communicated from the order creation application to the order fulfillment system 296.

Figure 3A:
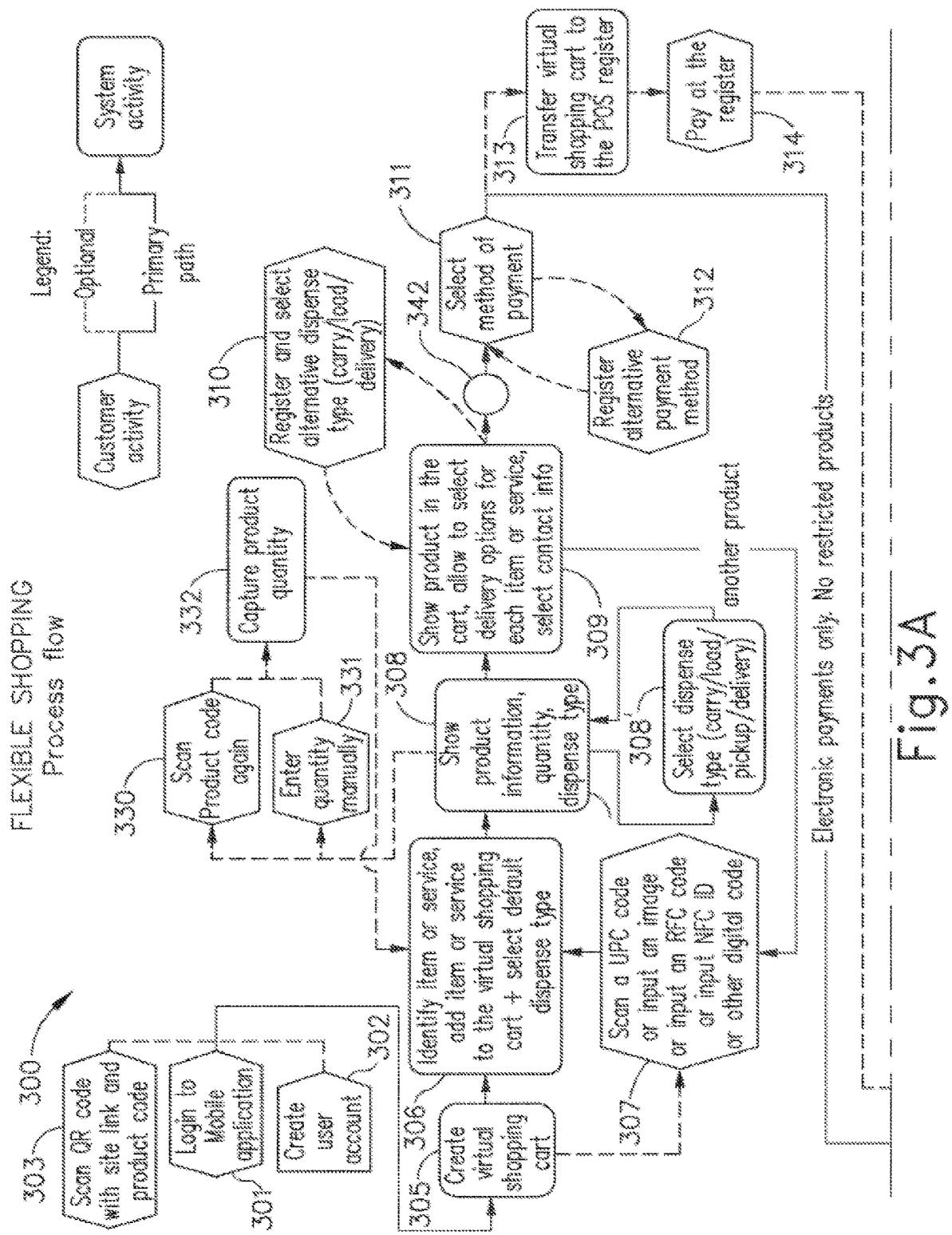
Figure 3B:
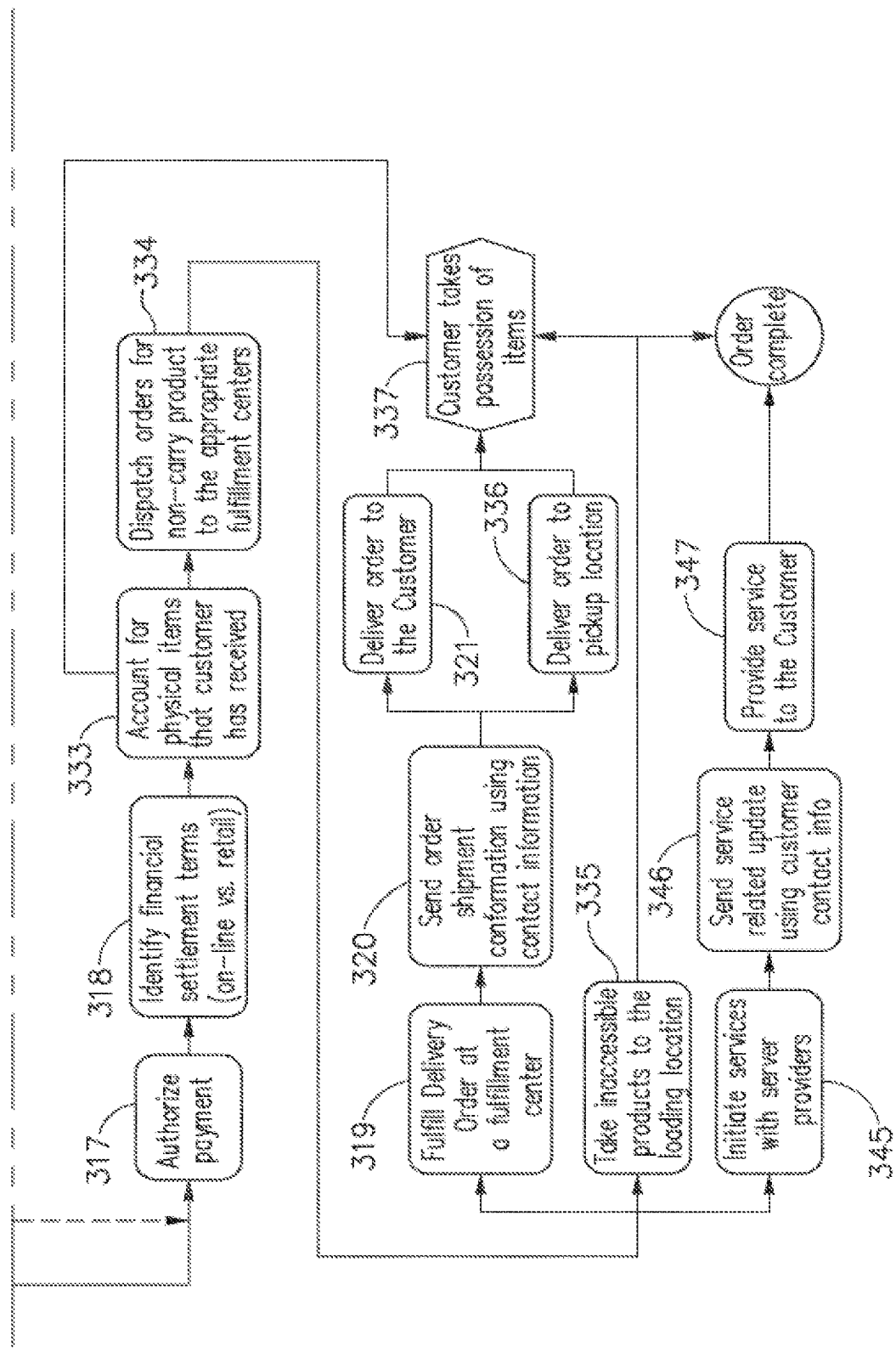

With reference to FIGS. 3A and 3B, a method 300 for purchasing a product with the local or mobile device 200 is initiated. Preferably, the method 300 begins either by having the user either login to the order creation application 400 via the local or mobile device 200 at block 301, having the user create a user account at block 302, or having the user manually input, scan, or capture identification information 222 at block 303. At block 301, the user may login to the order creation application 400 via the local or local device 200 and identify himself/herself by entering user identification information into the local device 200 via input means 210. User identification information may include a username, a password, or both a username and a password.

If user is launching the order creation application 400 for the first time, the user may be prompted to create a user account before entering user identification information, at block 302. In creating a user account, the user is prompted to enter additional user information in addition to user identification information in order to create an account. Additional user information includes any information which may be used to identify a user, such as user's name, a users address, a user's telephone number, payment information including a user's credit card information or other user financial information, a user's mobile wallet account information, a user's social security number, a user's driver's license number, a user's birthdate, a user's government ID, and other identifying information which may or may not be stored by the local or mobile device 200 or remote server 240.

In creating the user account, the user may be prompted to provide payment information regarding a preferred payment method or methods, including credit card information, debit card information, mobile wallet information, bank account information, and online payment information (i.e. PayPal™ account information). The user may also be prompted to provide fulfillment information regarding a preferred order fulfillment method, such us a the user's address, the user's vehicle information, and information for any other address or location in which the user may wish to have products within an order sent to. If a user is a new user, and the user is prompted to create an account, the user's account is then registered with the order creation application 400. Preferably, both the payment information and fulfillment information are then captured and saved by the order creation application 400.

The user may not have to create an account or enter user identification information in order to use order creation application 400. In one embodiment, the user may use order creation application 400 anonymously without creating an account, and therefore, in this embodiment, an anonymous virtual shopping cart is created while the user is still shopping. When the user reaches the point when the user has to identify himself, i.e. to purchase products 220 via order creation application 400, the user may have to then enter user identification information or additional information which identifies the user. Under some scenarios, when the cart has only carry out products and payment is with cash or with a gift card thorough a point of sale terminal, no user account need to be created at all and no information which identifies the user may need to be entered into the application 400.

In one embodiment, preferred payment method and order fulfillment method information is transmitted to the order creation application 400 from a third party, such as a third-party mobile payment system or electronic payment application 293 (such as PayPal™), as shown in FIG. 2. The electronic payment application 293 may be setup by a plurality of brick-and-mortar retailers, or by an entity which is separate and apart from the brick-and-mortar retailer in which the products 220 are being purchased. The electronic payment application 293 contains preferred payment method and order fulfillment method information which was provided earlier by the user and is transmitted to the order creation application 400, at the user's discretion. The electronic payment application 293 may also contain additional user information which may or may not be shared with and transmitted to the order creation application 400, at the user's discretion. In regards to the present invention, the electronic payment application 293 serves as just another form of payment that the user may use.

Preferably, upon identifying the user, and creating an account for the user (if necessary), the order creation application 400 then provides the user with a home screen of the order creation application 400. The home screen may display store identifying information which provides information that identifies the specific brick-and-mortar retail establishment in which the user is in, for example, by stating the city and state in which the retail establishment is in or a store number for the retail establishment. Preferably, the local or mobile device 200 uses the location information processing means to determine the stove identifying information. Preferably, the home screen includes a virtual shopping cart button, which when selected, presents the user with a virtual shopping cart on the screen of the local or mobile device 200, as shown in block 305.

With reference to FIGS. 3A and 3B, in one embodiment, if the user already has an account or has already logged into the order creation application 400, the user may then manually input, scan, or capture the identification information 222 including a product code 227, in order to begin the process of purchasing the product 220, at block 303. Preferably, the user brings the local or mobile device 200 to within a line of sight of a device displaying identification information 222 in order to visually scan identification information 222 or near a device containing identification information 222 to enable wireless capture, such as RFID or NFC-based capture, of identification information 222. The user may also manually input the identification information 222 into the local or mobile device 200.

Using the local or mobile device 200, the existing user may manually input, scan, or capture the identification information 222 which contains the product 220's product code 227, at block 303. The product 220's product code 227 is a unique identifier which identifies the product 220. Preferably, the local or mobile device 200 uses the order creation application 400 to scan or capture the identification information 222 and to later purchase the product 220. The order creation application 400 may be run from a website or run on the local or mobile device 200. The local or mobile device 200 then transmits the identification information 222 to the order creation application 400. Preferably, upon manually inputting, scanning, or capturing the identification information 222 at block 303, a virtual shopping cart, to virtually place the product 220 in, is created by the order creation application 400, at block 305.

In one embodiment, the user may manually input, scan, or capture identification information 222 which contain a QR code 225 at block 303. The QR code 225 preferably contains the product 220's product code 227 along with information 280 which provides a link for the local device 200 to access a website, which contains more information about the product 220. In one embodiment, the website contains the order creation application 400 used to purchase the product 220.

Figure 4:
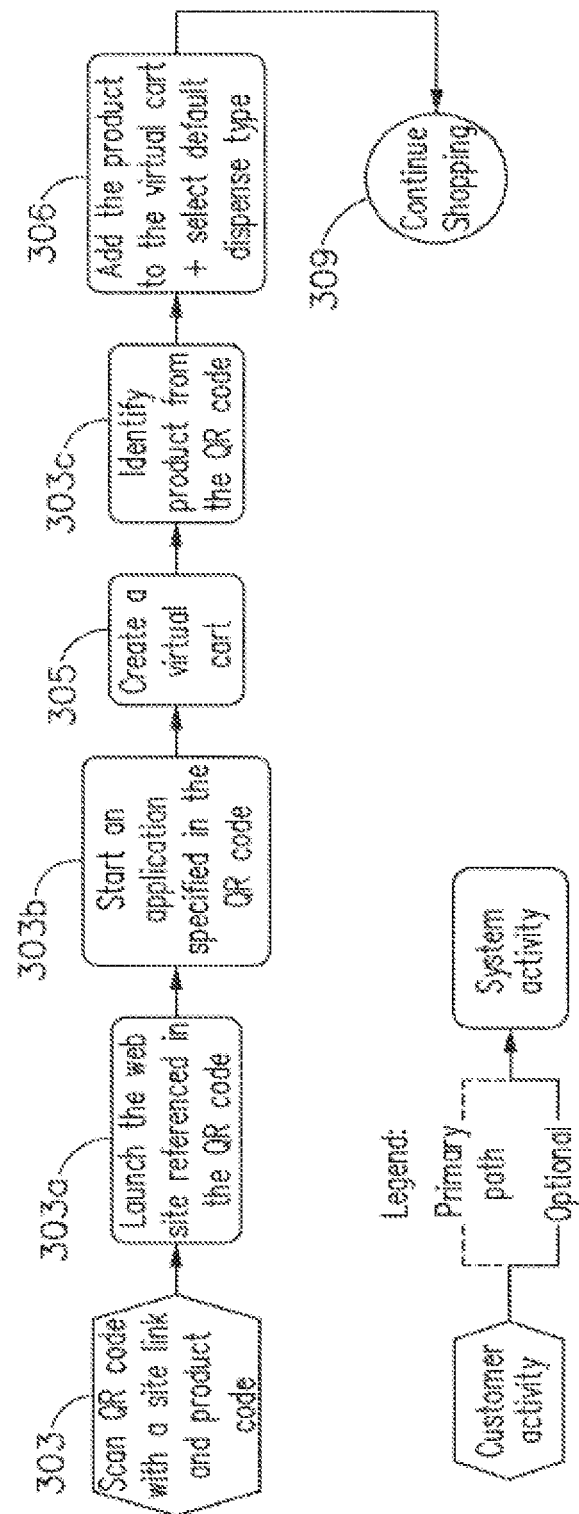

With reference to FIGS. 3 and 4, upon inputting, scanning, or capturing the QR code, at block 303, the local device 200 automatically opens the order creation application 400 used to purchase the product 220, and the product 220's product code 227 is transmitted to the order creation application 400. The order creation application 400 preferable resides at the website, however, it is possible to have the order creation application 400 reside on the local device 200 or any other computer connected with the local device 200. At block 303a, upon inputting, scanning, or capturing identification information 222 which contain QR code 225, preferably a website, which contains more information about the product 220, is launched and presented to the user. Preferably, the website is in communication with or contains the order creation application 400. Preferably, upon scanning the QR code at block 303 and launching the website at block 303a, the order creation application 400, or any other application used to assist in purchasing the product 220, which is preferably specified in the QR code, is then launched as well at block 303b. The website provides the user with additional information about the product 220, and preferably provides the user with the price of the product 220. In this manner, by simply inputting, capturing or scanning identification information 222 which contains a QR code 225, a website which contains more information about the product 220, is launched and presented to the user, and an application, such as the order creation application 400, is launched as well.

Upon launching the website at block 303a and opening the order creation application at block 303b, a virtual cart is then created at block 305, the product 220 is identified from the QR code at block 303c, and the identified product 220 is added to the virtual cart, preferably automatically added to the virtual cart, at block 306.

In one embodiment, upon adding the product 220 to the virtual shopping cart, a dispense type is selected for the product 220 added to the virtual shopping cart at block 306, preferably by the user. However, a default dispense type may also be automatically selected by the application 400. The default dispense type designates a predetermined or preregistered manner in which the user would like the product 220 dispensed. Preferably, the default dispense type is selected from a group of dispense types which includes things such as: personally carrying the product 220 out of the brick-and-mortar retail establishment, also known as "carry," having the product 220 loaded into the user's vehicle, also known as "load," having the product 220 provided to the user at a predetermined location whereby the user will go to get that product 220, also known as "pickup," and delivering the product 220 to the user at a predetermined location, also known as "delivery." Upon selecting the dispense type for the product 220, the order creation application transmits the dispense type to the brick-and-mortar retail establishment, and preferably to an order fulfillment center, for processing the order.

Additionally, once the dispense type is selected, for each dispense type a fulfillment method is selected, either automatically, such as by the application 400, or manually by the user. The fulfillment method may be automatically selected from a preregistered list of fulfillment methods, or from a single provided fulfillment method, based on many factors such as the dispense type and/or the method of inputting the identification information. The user may select a preregistered fulfillment method or provide a fulfillment method, if necessary, that is specific to that user. The fulfillment method provides additional information specific to the user, such as a user's local, home, or business address or a user's vehicle identifying information. For example, if the dispense type selected is "load," then identifying information about the user's vehicle may be provided or selected by the user from already entered information, and if the dispense type selected is "delivery," then information such as the address of the place that the user wishes the product 220 to be delivered is selected. Preferably, for each product 220 in the order, a dispense method and a fulfillment method is selected, either automatically, or manually by the user.

Both the website and the application 400 assist the user in purchasing the product 220. In addition to launching a website find an application, upon simply inputting, capturing or scanning identification information 222 which contains a QR code 225, a virtual shopping cart is created, preferably by either the website or the application 400, and the product 220 is preferably automatically placed in the virtual shopping cart as well.

Upon the method 300 beginning by either by having the user either login to the order creation application 400, preferably via the local or mobile device 200 at block 301, having the user create a user account at block 302, or having the user manually input, scan, or capture identification information 222 at block 303, a virtual shopping cart is created, at block 305. Preferably, the virtual shopping cart is created by the order creation application 400, at block 305. Preferably, the order creation application 400 may run on the remote server 240 (local device 200 acting as a client) or on the local device 200 itself. Preferably, the application 400 interacts with other system components through the remote server 240. Remote server 240 hosts the web site. Virtual shopping cart is created by the order creation application 400.

Upon creating a virtual shopping cart at block 305, the product 220 is identified, preferably by using the manually input, scanned, or captured identification information 222, at block 306. Preferably, the product 220 is identified by or through the order creation application 400. In one embodiment, upon manually inputting, scanning, or capturing identification information 222 which contain QR code 225, preferably a website, which contains more information about the product 220, is in communication with the order creation application 400 and assists in identifying the product 220.

Alternatively, upon creating a virtual shopping cart at block 305, the user may then manually input, scan, or capture identification information 222 at block 307, for possibly another product 220 or for a first product 220, depending on whether the user has already manually input, scanned or captured identification information 222. Preferably, identification information 222 contains another product 220's UPC or product code 227, illustrations or images 229 of or on the product 220, information from an RFID device such as an RFC code, or information from an NFC sensor such as an NFC ID, or any other digitally encoded information 231, at block 307. Upon manually inputting, capturing, or scanning the identification information 222, the identification information 222 is then transmitted to the order creation application 400 and used to identify the product 220 at block 306.

Upon identifying the product 220 at block 306, the product 220 is then added to the virtual shopping cart at block 306. Preferably, the product 220 is automatically placed in the virtual shopping cart and an indicator is present near the virtual shopping cart button to indicate this.

Figure 5:
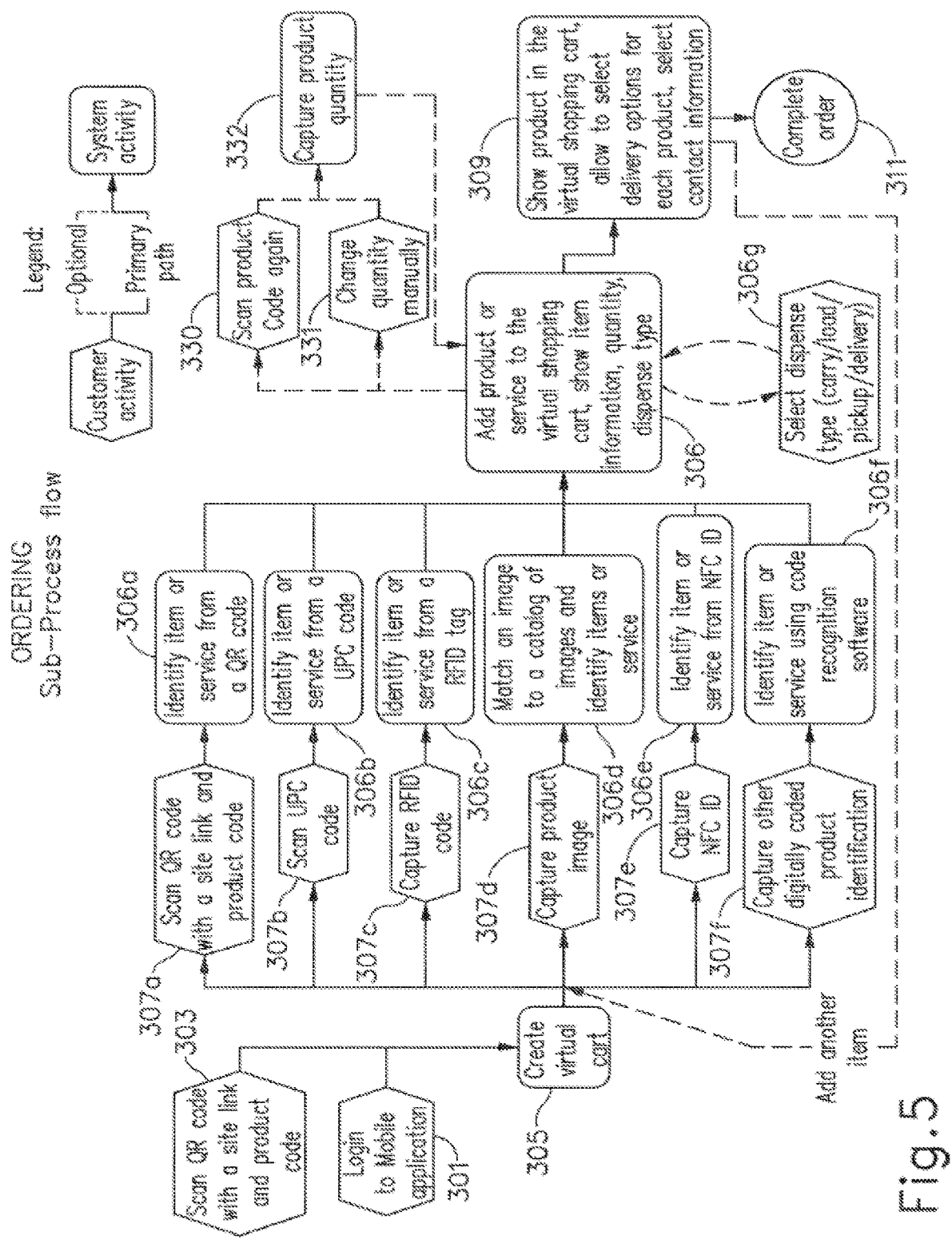

With reference to FIGS. 3 and 5, upon creating a virtual shopping cart at block 305, the user may then manually input, scan, or capture identification information 222 at block 307, for possibly another product 220 or for a first product 220, depending on whether the user has already manually input, scanned or captured identification information 222. With reference to blocks 307a-307f, manually inputting, scanning or capturing identification information 222 it block 307 may include manually inputting, scanning or capturing: a QR code 225, preferably having a site link to a website and a product code 227 for the product 220, at block 307a; a UPC code 224 linked to the product 220, at block 307b; a wireless code 233 such as an RFID code linked to the product 220, at block 307c; a product illustration or image 229 linked to the product 220, at block 307d; a wireless code 233 such us an NFC code linked to the product 220, at block 307e; and any other digitally coded product identification, at block 307f.

Upon manually inputting, scanning or capturing identification information 222 at blocks 307a-307f, the method 300 then identities the product 220, at block 306, which is broken down into corresponding blocks 306a-306f, depending on the type of identification information 222 which was manually input, scanned or captured at blocks 307a-307f. For example, at block 306d, the illustration or image 229 which was scanned or captured may be matched to another image within a catalogue of images in order to identify the product or service 220. Additionally, if other digitally coded product identification is captured at block 307f, then at block 306f, the product 220 may be identified using software, such as code recognition software. Upon identifying the product 220 at blocks 306a-306f, the product 220 is added to the virtual shopping cart at block 306.

Additionally, in one embodiment, upon identifying the product 220 at block 306, information regarding the product 220, is provided to the user, preferably at the home screen. The information regarding the product 220 may include a description of the product 220, the product 220's price, along with reviews regarding the product 220. In one embodiment, the information regarding the product 220 includes the price of the product 220 at other comparable online and local brick-and-mortar retail establishments which carry and sell the product 220. In this manner, the user can compare the price of the product 220 that the user wishes to purchase at other online and local brick-and-mortar retail establishments which carry and sell the product 220 in order to determine if the user should buy the product 220 from the current retail establishment that the order creation application 400 is linked to, or another retail establishment.

In one embodiment, upon presenting the user with product information regarding the product 220 that includes the price of the product 220 at other comparable online and local brick-and-mortar retail establishments which carry and sell the product 220, the user is provided the option to get a price match for the product 220 which matches the price of the current retail establishment with the lowest price listed provided to the user at other comparable online and local brick-and-mortar retail establishments. In this manner, by providing the user with information that includes the price of the product 220 at other comparable online and local brick-and-mortar retail establishments which carry and sell the product 220, and preferably by proving the user with an option to yet a price match for the product 220, the user is hopefully encouraged to purchase the product 220 at the current retail establishment instead of another retail establishment, thereby reducing the chance of showrooming by the user.

In one embodiment, once the product 220 is added to the virtual shopping cart at block 306, a default dispense type is selected for all products 220 in the virtual shopping cart, at block 306. Preferably, the default dispense type is selected by the user, however, it may also be automatically selected by the application 400, at block 306g. In one embodiment, the default dispense type is automatically selected based on the type of product 220 added, such as a locally accessible product 220, a locally inaccessible product 221, an online product, or a remote product. For example, if a remote product is added, then a default dispense type of "delivery" or "pickup" may be automatically selected based upon the distance of the remote product from the user. Additionally, if an online product is added, then a default dispense type of "delivery" may be automatically selected. If a locally accessible product 220 is selected, then a default dispense type of "carry" may be automatically selected. If a locally inaccessible product 221 is selected, then a default dispense type of "carry" or "load" may be automatically selected depending on the type of product 221 (i.e. overweight or expensive). In one embodiment, the default dispense type can be automatically selected or assigned based on the method of inputting a product 220's identification information 222 and then can be later changed by the user, if necessary. For example, when scanning a UPC code/barcode, the application 400 should set the default dispense type to "carry" and for selections made from an on-line catalog, set the default dispense type to "delivery."

Dispense type is defined as the manner in which the user would like the product 220 dispensed to the user, and includes things such as: personally carrying the product 220 out of the brick-and-mortar retail establishment, also known as "carry," having the product 220 loaded into the user's vehicle, also known as "load," having the product 220 provided to the user at a predetermined location whereby the user will go to get that product 220, also known as "pickup," and delivering the product 220 to the user at a predetermined location, also known as "delivery." For example, the user may determine and mark that each the product 220 added to the virtual shopping cart is by default a carry out product 220, that is, whether or not the product 220 is a product 220 that the user can receive at the brick-and-mortar retail establishment and/or carry out of the brick-and-mortar retail establishment.

With reference to FIG. 3, upon adding the product 220 to the virtual shopping cart at block 306, the user is shown information about the product 220, such as its mane or product identification information, at block 308. Additionally, at block 308, the user is also shown the quantity of products 220 ordered by the user, and the user has the option of enter additional quantities of that product 220 to the virtual shopping cart, either by manually inputting, scanning, or capturing identification information 222 again, such as by scanning the product code 227 again a block 330, or the user may manually enter additional quantities of that product 220 at block 331. Upon manually inputting, scanning, or capturing identification information 222 again at block 330 or upon manually entering additional quantities of that product 220 at block 331, the product quantity is captured within the virtual shopping cart at block 332, and the method 300 moves to block 306. Additionally, at blocks 308 and 308', the user is able to select a different dispense type for each individual product 220 added to the virtual shopping cart.

Additionally, if no additional quantities of that product 220 to the virtual shopping cart are desired, then upon adding the product 220 to the virtual shopping cart at block 308, the method 300 moves to block 309 whereby all the products 220 which have been added to the virtual shopping cart are shown to the user, and the user is allowed to select fulfillment or delivery options for all or for each product 220 which has been added to the virtual shopping cart. Additionally, at block 309, the user is allowed to select or input contact information for the user. Contact information for the user may include the user's email address, home address, shipping address, billing address, and telephone number. The user may select a preregistered contact information or the user may input new contact information at block 309. Delivery options preferably include information about locations at which the user wishes to have products 220 delivered to or picked-up from or loaded into the user's vehicle.

Preferably, upon adding the products 220 to the virtual cart at block 308, the user may select a checkout button, which moves the method to block 309 and presents the user with the total contents of the virtual shopping cart.

Upon showing all the products 220 which have been added to the virtual shopping cart to the user, and upon the user being allowed to select fulfillment options at block 309, the user may add additional products 220 at block 307.

Alternatively, upon showing all the products 220 which have been added to the virtual shopping cart to the user, and upon the user being allowed to select fulfillment at block 309, the user then has the option to select and/or register alternative fulfillment or dispense options for how the user wishes each product 220 in the virtual shopping cart to be fulfilled, at block 310.

At blocks 309 and 310, the user is presented with the options of selecting either a preregistered manner of dispensing or fulfilling the order or a new manner of dispensing or fulfilling the order, entered manually by the user. The user may select a different manner of dispensing or fulfilling the order for each product 220 within the order. The manner of dispensing or fulfilling the order includes any one of a number of fulfillment methods, such as delivering a product 220 within the order to a user specified location, making a product 220 within the order available for later pick up at the brick-and-mortar retail establishment, personally carrying a product within the order out of the brick-and-mortar retail establishment, arranging for recurring delivery of a product 220 within the order to a user specified location, or retrieving a local inaccessible product 221 within the order from a storage location within the brick-and-mortar retail establishment and delivering the local inaccessible product 221 to a loading location. Products 220 which are part of an order, may be split into separate fulfillment orders, depending on the method of dispense and fulfillment.

Figure 6:
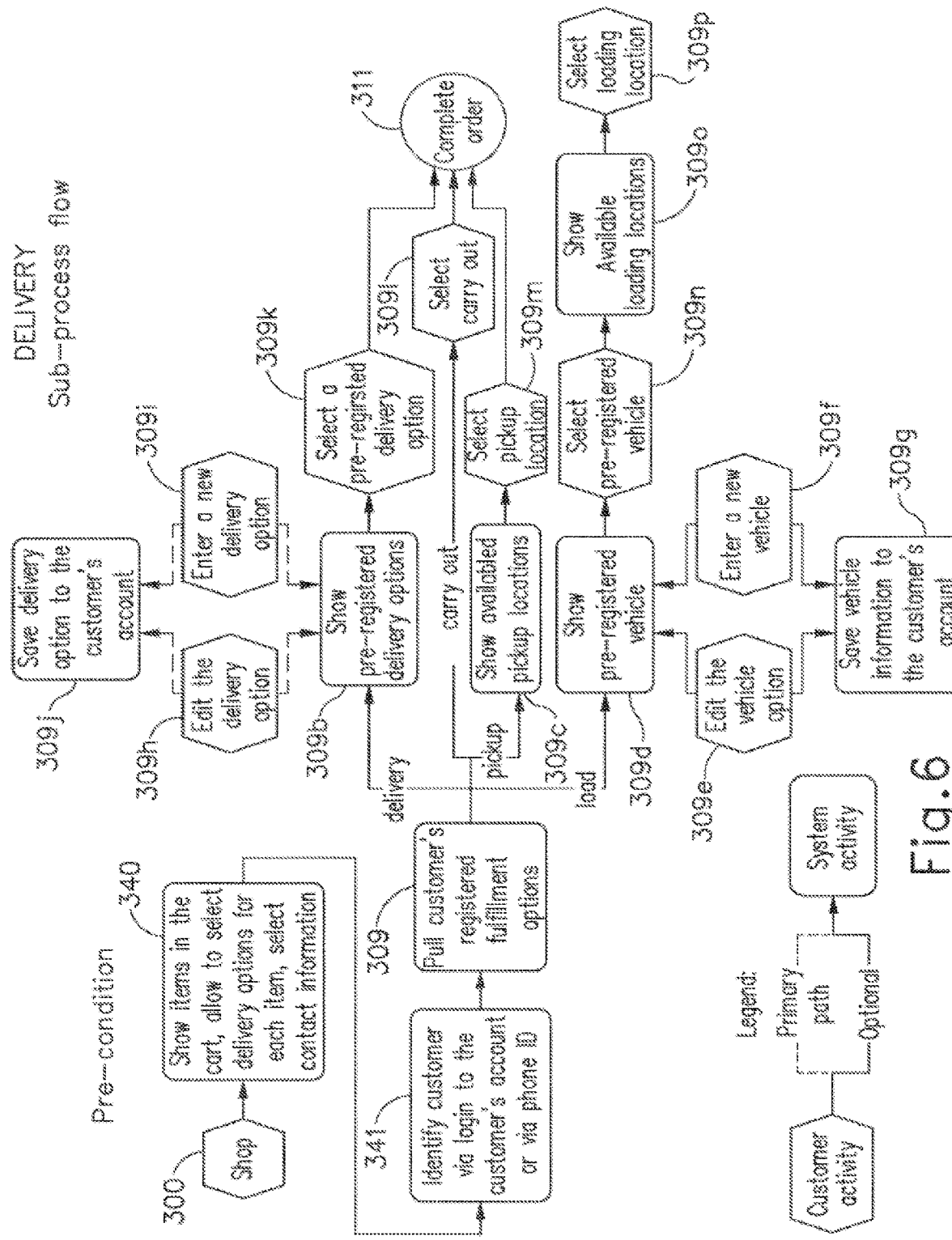

With reference to FIG. 6, in one embodiment, the user proceeds to shop for products 220 using method 300, at block 300 labeled "shop." Then upon shopping for products 220, the method 300 moves to block 309, whereupon the user is presented with the option of selecting a preregistered a manner of dispensing or fulfilling the order, and then to blocks 340 and 341.

At block 340, the method 300 includes identifying the user or customer via login to the customer's account or login at the order creation application 400, or via a unique identifier 282 which is preferably transmitted to the order creation application 400. Upon identifying the user at block 340, the user's preregistered fulfillment options are retrieved at block 341.

If a delivery fulfillment option is selected, the method 300 moves from block 341 to block 309b, whereby the user is shown preregistered delivery options, such as delivery to preregistered address, preferably entered by the user. If the preregistered delivery options are not desired by the user, then the user has the option of editing the delivery option information at block 309h or entering new delivery option information at block 309i. Delivery option information contain information provided by the user in order to help fulfill delivery of the product 220 to the user, such as the user's home address, work address, or other such address, the user's telephone number, and/or the user's email address. Then the new delivery option information is saved to the user's account at block 309j, and the method goes back to block 309b. Upon showing the registered delivery option to the user at block 309b, the user then selects a registered delivery option at 309k, and the order is moved to completion at block 311.

If a carry out fulfillment option is selected, the method 300 moves from block 341 to block 309l, whereby the user selects to personally carry a product from and leave the retail establishment, and then the order is moved to completion at block 311.

If a pickup fulfillment option is selected, whereby the user chooses to pick-up the product 220 at a pre-designated location, the method moves from block 341 to block 309c, whereby available pre-designated or pickup locations are shown to the user. The user selects a pickup location at block 309m and thin the order is moved to completion at block 311.

If a load fulfillment option is selected, whereby the user desires that the product 220 is loaded into or performed on or at the user's vehicle, then the method moves from block 341 to block 309d whereby the user is shown preregistered vehicles and then selects a preregistered vehicle for which the product 220 is loaded into or performed on or at, at block 309n. If the preregistered registered vehicles shown are not desired by the user, then the user has the option of editing vehicle option information at block 309e or entering new vehicle option information at block 309f. Vehicle option information contains information provided by the user in order to help fulfill loading the product 220 into the user's vehicle, such as a description of the user's vehicle including things such as the make, model, year and color of the user's vehicle, the vehicle's license plate number, or other identifying information or features of the user or the user's vehicle. Then the vehicle option information is saved to the user's account at block 309g, and the method goes back to block 309d, where the user is shown preregistered vehicle options. Upon showing the preregistered vehicle options to the user at block 309d, the user then selects a preregistered vehicle option at 309n. Upon selecting a preregistered vehicle at block 309n, the method moves to block 309o, whereby available loading locations are shown to the user and the user selects an available loading location at block 309p, and then the order is moved to completion at block 311. Available loading locations are provided by the brick-and-mortar retail establishment to the user, preferably via the order creation application 400, and include any location in which the user's vehicle can travel to and park in order to load product 220 into the vehicle. Available loading locations may include specific addresses, dock numbers or names, or even GPS coordinates or links which provide information to the user sufficient to locate a location.

Upon selecting fulfillment options at block 309, the method moves to block 311 whereby the user is presented with the options of selecting either a registered payment method or inputting a new or selecting an alternative payment method, at block 312, for the order.

Figure 7:
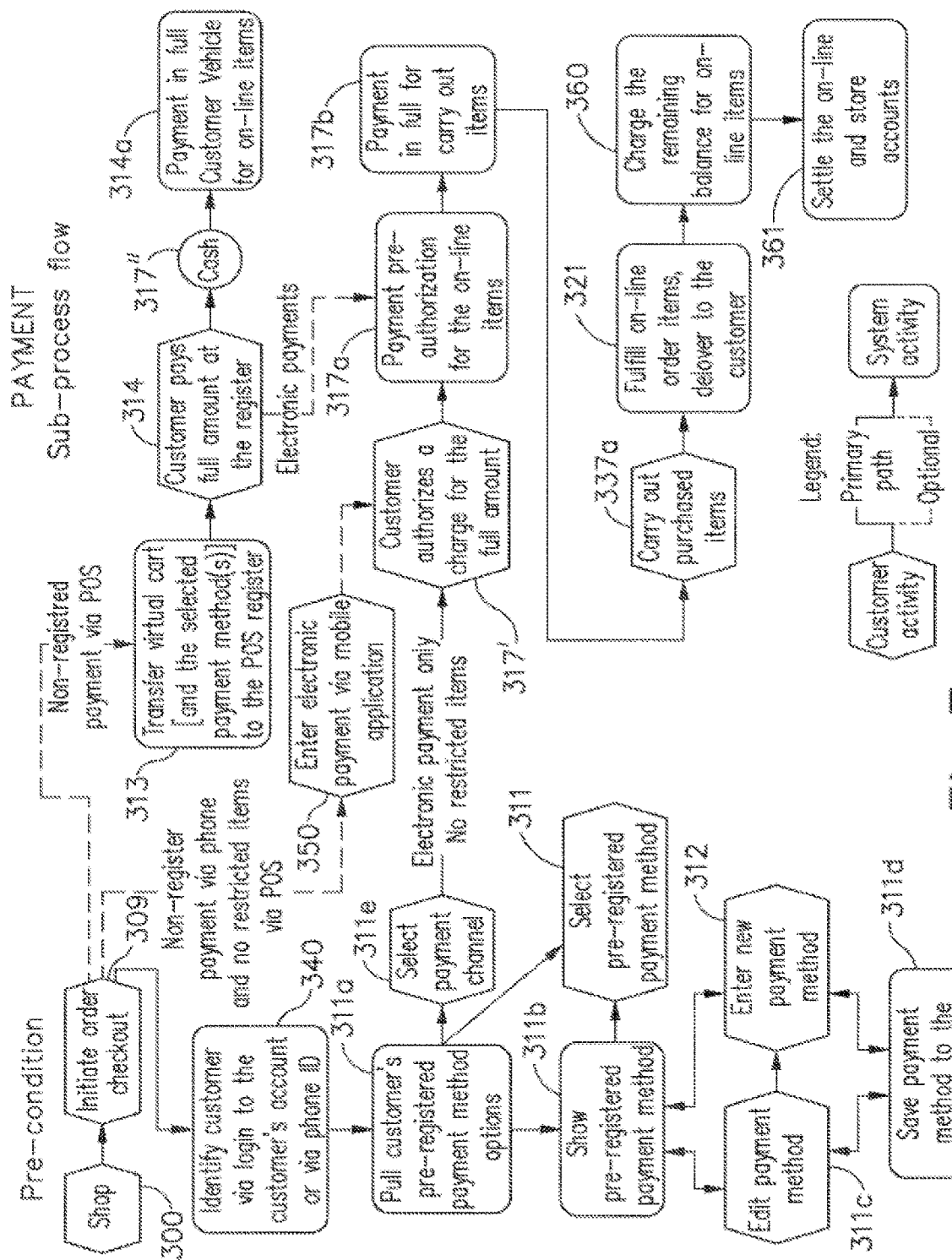

With reference to FIG. 7, the user initiates an order checkout at block 309, whereupon the user is shown all the products 220 in the virtual shopping cart, and the user is allowed to select a fulfillment option for each product 220 in the virtual shopping cart. Then, the method either moves to block 311a where the user's registered payment method options are pulled, to block 350 for non-registered payment methods made via telephone having no restricted products whereby an electronic payment is entered, or to block 313 for non-registered payment methods made via a point-of-sale device.

Moving to block 311a, the user's registered payment method options are retrieved, preferably by the order creation application 400 and preferably from remote server 240, and then the user is requested to select a registered payment method at block 311 and then a payment channel is selected at block 311e, preferably by the order creation application 400.

Preferably, the registered payment methods are shown to the user at block 311b, and the user either selects a registered payment method at block 311 and edits or enters new payment methods blocks 311c or 312. Payment methods may include any type of payment methods, such as PayPal™ or other online payment methods, credit cards, debit cards, money order, government benefit, gift cards, checks, and any other financial instrument which can be used to purchase the product 220. Each registered payment method preferably includes the user's payment method information, for each user's own payment methods. The user's payment method information may include any one of the user's registered payment methods associated with the user's account, such as a PayPal™ account or other online payment account information, credit, debit, money, government benefit, or gift card information, bank account information, and any other information related to a financial payment methods which can be used to provide authorization of funds to purchase the product 220. At block 311b, if a user does not wish to select a registered payment method, the user may edit a registered payment method at block 311c to change any of the user's payment method information, or the user may enter a new registered payment method at block 312 and then save the edited or new registered payment method information to the user's account at block 311d. After saving the edited or new registered payment method information to the user's account at block 311d, the user may then select a registered payment method at block 311. The user may select a different fulfillment and payment methods for each product 220 within the order.

Upon selecting fulfillment and payment methods for products 220 within the order, the user then moves to block 311e whereupon the user is requested to select a payment type, preferably by the order creation application 400. Payment type selection involves deciding whether or not the user wishes to use actual physical payment instruments or electronic payment instruments. Actual physical payment instruments are payment instruments which are carried by the user such as physical credit cards, checks, cash or other type payment methods which are on the user and being carried by the user. Electronic payment instruments are non-physical, electronic methods of payment and includes any payment method information which is in electronic form. If the payment type selected is an actual physical payment instrument, then the method 300 moves form block 311e to block 313, whereby the virtual shopping cart and its contents are transferred along with a selected payment method to a retail point of sale terminal, such as a cash register or self-checkout kiosk. Then at block 314, the user then pays for the full amount of the order at the retail point of sale terminal, using the selected payment method. As a result, the present method 300 provides the user with the ability to pay for the entire order using a single transaction or single payment, regardless of whether the order includes local accessible products, local inaccessible products 221, online products, or remote products.

If the selected payment method is cash, the user essentially then authorizes payment by handing the cash to the cashier or point of sale terminal at block 317", and any online products are paid in full at that time, at block 314a, and the method moves to block 317b whereby payment in full is registered for all products 220, including carry out products. If the selected payment method is an electronic instrument which needs to be later cleared, such as a credit cards or checks, then the method 300 moves from block 314 to block 317a, whereby a payment pre-authorization for any online products being purchased in the order is made, and then once the online products are latter fulfilled, as shown in block 321, the remaining balance is charged to those electronic instruments at block 360 and the online and local brick-and-mortar retail establishment accounts are settled at block 361. Upon obtaining a payment pre-authorization for any online products being purchased in the order, the method moves from block 317a to block 317b.

At block 311e, if the payment type selected is an electronic payment instrument, then the method 300 moves form block 311e to block 317', whereby the user authorizes a charge for the full amount of the order, preferably using the order creation implication 400 via the local device 200 to make an electronic payment for the products 220. As a result, the present method 300 provides the user with the ability to pay for the entire order using a single transaction or single payment, regardless of whether the order includes local accessible products, local inaccessible products 221, online products, or remote products. A single transaction or single payment, may use multiple payment types for each of the products 220 being ordered, however, a single authorization for payment is all that is required for all products 220 in the order, regardless of what the products types of each product 220 in the order is (i.e. local accessible products, local inaccessible products 221, online products, or remote products), thus forming what is known herein as a "single transaction" or "single payment" for the order. The order in which a single payment or single transaction is made, can cover a variety of different product types (i.e. local accessible products, local inaccessible products 221, online products, or remote products) which may have to be obtained through various fulfillment methods or channels (i.e. via a local brick-and-mortar retail establishment, via a nearby brick-and-mortar retail establishment, via an online website and a remote warehouse, and via a loading dock), and is therefore known as a multi-channel order. Once the "single payment" is authorized, actual payment for each product 220 in the order may be made at various times. For example, payment for some products 220, such as local accessible products which are in the user's possession or physical shopping cart, may be made immediately, either via electronic payment or using cash or some other form of payment, either via the local device 200 or via a point of sale terminal. Payment for other types of products, such as local inaccessible products 221, online products, or remote products, may be made once the user receives the product 220 or the product 220 has been shipped or delivered to the user. As a result, payment for products 220 in the order may be made at various times depending on the products 220 in the order, however, the payment authorization for all products 220 in the order is made all at once, with a single authorization, using a single transaction.

A multi-channel order allows the user to purchase a variety of different products 220 using a variety of different payment and fulfillment methods, all within a single order and paid for in a single transaction to providing the user with a flexible shopping experience. Paying for the order, or authorizing payment for the order, using a single transaction requires the user to make a single authorization of payment for the entire order, preferably all at one instance in time, such as buy pressing a "purchase confirmation" button provided by the order creation application 400, which indicates that the user wishes to purchase all products 220 in the virtual shopping cart or order, in accordance with the payment method or methods selected for each product 220 in the virtual shopping cart or order, and in accordance with the fulfillment method or methods selected for each product 220 in the virtual shopping cart or order.

Additionally, a multi-channel virtual shopping cart or multi-channel order is created when placing a variety of different products 220 of varying product types (i.e. local accessible products, local inaccessible products 221, online products, or remote products) using a variety of different payment channels (electronic or mobile payment using a local device 200, payment via a kiosk, and payment via a point of sale terminal), using a variety of different payment methods (i.e. credit card payment, debit card payment, money order payment, check payment, cash payment, government benefit payment (i.e. food stamps), gift card payment, travelers check payment, or online account payment such as a PayPal™ account or other online account) and a variety of different fulfillment methods (i.e. delivery, pickup, or load), all within a single virtual shopping cart or all within a single order.

Preferably, in one embodiment, the present invention allows for a "single payment" or "single transaction" to be made for a multi-channel virtual shopping cart or multi-channel order having a variety of different products 220 of varying product types using a variety of different payment channels, using a variety of different payment methods and a variety of different fulfillment methods, all within a single virtual shopping cart or all within a single order. Preferably, in this embodiment, upon making the "single payment" or "single transaction," the systems within this invention then arrange for actual payment of each product 220, the timing of which may depend on the product type, the order fulfillment method, and the payment method. For example, if the product is an online product and the payment is an electronic or mobile payment using a local device 200, then the actual payment may be made once the product 220 is actually shipped by the retailer. Additionally, upon making the "single payment" or "single transaction," the systems within this invention may also automatically choose an order fulfillment method and fulfill the automatically chosen fulfillment method, if a fulfillment method is not already selected. In this manner, a user can purchase products 220 which have a variety of different product types, which have a variety of different order fulfillment methods, and a variety of different payment methods using a variety of different payment types all within a single order, using a "single payment" or "single transaction."

Then the method moves to block 317*a*, whereby payment preauthorization is made for on-line products being ordered and then to block 317*b* whereby payment is made in full for carry out products. From block 317*b*, the method moves to block 337*a*, whereby purchased products 220 which are carry out products are then carried out of the brick-and-mortar retail establishment.

With reference to FIGS. 3A and 3B, upon showing the products 220 to the user in the virtual shopping cart at block 309 and before authorizing payment at block 317, the user may be then presented with subtotal information with a subtotal amount for the contents of the virtual shopping cart and total information which presents the user with a total amount for the order which contains the contents of the virtual shopping cart. If the user confirms his/her intent to purchase product 220, and authorizes the payment of the order via order creation application 400, then the method 300 moves to block 317 whereby payment authorization is requested from a financial institution associated with the user in accordance with the payment method, or payment methods selected.

In one embodiment, the user may decide not to authorize payment of the order via order creation application 400. In this embodiment, the user may then transfer the contents of the virtual cart to an alternate purchasing system, such as a point of sale (POS) terminal or a self-checkout terminal at block 313, and then pay for the order via the alternate purchasing system, at block 314. Then the method 300 moves to block 317 whereby payment authorization is requested from a financial institution associated with the user in accordance with the payment method, or payment methods selected.

Preferably, upon authorizing payment at block 317, payment information is generated and then transmitted to the remote server 240, whereupon the order is then marked paid and a receipt is generated and provided to the user, either physically or digitally.

Preferably, upon authorizing payment at block 317, the financial settlement terms are identified at block 318, whether the order was authorized electronically via the order creation application 400 or at a brick-and-mortar retail establishment by an alternate purchasing system. Preferably, an acknowledgment that payment has been received is sent to the local device 200 from the remote server 240 and displayed to the user via a payment received screen which is generated by the order creation application 400. In one embodiment, a digital copy of the receipt is transmitted to the user from the remote server 240. Preferably, the digital copy of the receipt is transmitted from the remote server 240 to the local device 200 and displayed. In one embodiment, the digital copy of the receipt is transmitted from the remote server 240 in an email to an email address of the user. Preferably, upon generating and sending an acknowledgment that payment has been received, the server 240 then changes the current virtual shopping cart into a past virtual shopping cart, retrievable by the user via the order history button. Sales transaction and receipt information is stored on the remote server 240 and is thus accessible for a variety of purposes: including but not limited to: asset protection solutions, return validation, customer reference, and the like.

Upon identifying the financial settlement terms at block 318, an accounting for all physical or carry out products that that the user has received and purchased is conducted at block 333, and preferably, this information is provided to remote server 240. Any products 220 in the order that are not physical or carry out products that that the user has received are then reviewed along with their fulfillment method (i.e. delivery, pickup, or load) and dispatch orders are sent to appropriate fulfillment centers in order to fulfill ouch product 220 in the order at block 334. Fulfillment centers include online fulfillment centers for mailing and delivering online products 220, local fulfillment centers, such as nearby brick-and-mortar retail establishments or loading docks, for fulfilling pickup or load fulfillment methods. For some products 220, such as carry out items, the customer immediately takes possession of the products 220 at block 337, once an accounting for all physical or carry out items that that the user has received and purchased is conducted at block 333, whereby the order is complete.

In addition to sending orders for products 220 which are items to the fulfillment centers, orders for products 220 which are services may also be sent out. Services, such as warranties, may be fulfilled or activated or initiated by the brick-and-mortar retail establishment or through a third party service provider at block 345. For example, phone activation for an ordered service may be initiated with a third party company that provides the ordered service. At block 346, updates related to the service may be sent to the user using the user's contact information and then the service may be provided to the user at block 347, whereby the order is completed.

Upon sending dispatch orders at block 334, the method 300 moves to block 319, and the order is fulfilled by the retail establishment at a fulfillment center and an order shipment confirmation is sent to the user using the user's contact information at block 320 once the order has been fulfilled by the fulfillment center. The order may be fulfilled in any one of a number of ways. In one embodiment, the order is fulfilled by the user by allowing the user to grab the product 220 from the shelf and personally carrying a product from and leave the retail establishment. In another embodiment, the order is fulfilled via a fulfillment center, such as an online fulfillment center, by shipping the product 220, sending an order shipment confirmation to the user using the user's provided contact information at block 320, and then delivering the product 220 to the user, preferably to a pre-designated location or providing the service at a pre-designated location, at block 321. Alternatively, the order may be delivered to a pre-designated pickup location, at block 336 if the product 220 is a local inaccessible product 221.

Upon dispatching orders for non-carry out products, products 220 which are not locally accessible, such as a local inaccessible product 221, an online product, or a remote product, the method moves to blocks 334, 319, 335, 320, 321, and 336 in order to fulfill the order. Products 220 which are not locally accessible may be delivered to the user in one of many ways. In one embodiment, the products 220 is delivered to the user's address of choice by shipping the product 220 via postal, delivery, or courier services or providing the service at a pre-designated location at block 320. In another embodiment, the product 220 is a local inaccessible product 221 located in a brick-and-mortar retail establishment. The local inaccessible product 221 is any product which can be purchased at a brick-and-mortar retail establishment, but for any reason, must be provided to the user by an employee of the brick-and-mortar retail establishment. For example, large items, such us furniture, televisions, or lawn equipment, may be too large to place on the shopping floor of the brick-and-mortar retail establishment or too heavy for the user to pick-up on his own, and require an employee of the brick-and-mortar retail establishment to assist in the delivery of such a product. Additionally, expensive items, such as jewelry, watches, or electronics, may be too valuable to place on the on the shopping floor of the brick-and-mortar retail establishment and require an employee of the brick-and-mortar retail establishment to assist in the delivery of such a product. Preferably, for a local inaccessible product 221, the local inaccessible product 221 is taken to a loading location, such as a loading dock, at block 335, and then the customer takes possession of the product 221.

Furthermore, some products may not be available at the brick-and-mortar retail establishment, such as a warranty service or a car repair service, and need to be delivered to or performed at a pre-designated location other than the brick-and-mortar retail establishment. The product 220 is delivered to this pre-designated or pickup location at block 336. The pre-designated location can be a customer's home or another shipping location, such as a relative or friend's location, or an alternative pickup location. The product 220 may be delivered to the user by drop shipment using a traditional mail carrier, such as UPS or the USPS, or home delivery by the brick-and-mortar retail establishment, as shown in block 321. Home delivery may include an option of installation. Some products 220, such as groceries and/or bulky items, may be delivered or provided locally by the brick-and-mortar retail establishment. Some products 220 are not available at the brick-and-mortar retail establishment and may be shipped using a mail carrier or provided remotely, such as some services.

In one embodiment, the user provides the local or mobile device 200 with identification information 222 for the local inaccessible product 221. Preferably, the identification information 222 is located within the brick-and-mortar retail establishment.

Figure 8:
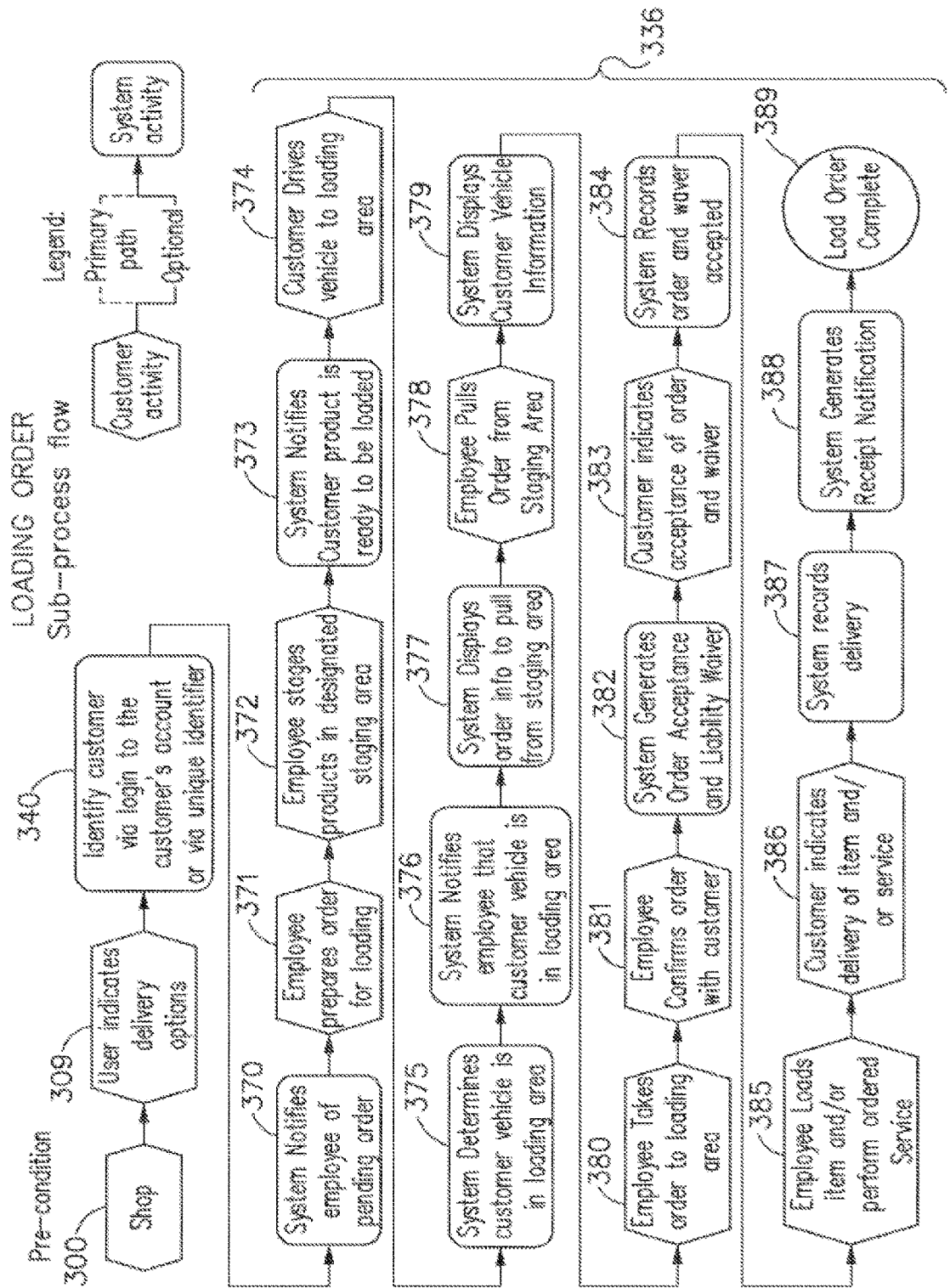

With reference to FIG. 8, once the local inaccessible product 221 is placed in the virtual shopping cart at block 308, then at block 309, the user selects or indicates delivery options for that local inaccessible product 221. Preferably, the local inaccessible product 221 is required to be provided to the user by meeting the user or the user's vehicle at a pre-designated location. If the local inaccessible product 221 is to be purchased, then loading options are selected by the user at block 309. The loading options provide the retail establishment with information about the user or the user's vehicle, so that the retail establishment may identify and meet with the user or the user's vehicle. The loading options may include user identifying information which identifies the user, such as a photograph or description of the user provided to the application 400 by the user. The loading options may include vehicle identifying information provided to the application 400 by the user.

Preferably, the vehicle identifying information is preregistered in the order creation application 400, however the user may manually enter new vehicle identifying information into the application 400. Vehicle identifying information is any information which can identify a vehicle, preferably the vehicle that the user is driving, and includes such things as the vehicle's make, model, year, color, license plate number, VIN number, a photo of the vehicle, or any information which may be used to identify the vehicle that the user is driving, such as location information. In one embodiment, the vehicle identifying information includes location information detailing the present location of the user's vehicle. Preferably, the vehicle identifying information is transmitted along with the order to the order fulfillment system. The vehicle identifying information is used to identify the user's vehicle by the retail establishment. In one embodiment, the vehicle identifying information is keyed in manually or selected from a plurality of the preregistered delivery methods.

Preferably, the application 400 provides the user with information regarding a pre-designated area where the local inaccessible product 221 may be retrieved or provided. Preferably, the pre-designated area is near or part of the brick-and-mortar retail establishment. However, the pre-designated area may be remote from the retail establishment, such as at a storage depot or even another retail establishment.

Then, at block 370, the system notifies an employee at the retail establishment of a pending order for the local inaccessible product 221. Moving to block 371, the employee then retrieves the local inaccessible product 221 and prepares the order for loading into the user's vehicle or providing to the user. The local inaccessible product 221 is then staged in a designated staging area, next to or near the pre-designated area, at block 372. Once the local inaccessible product 221 is staged in a designated staging area, the user is notified that the order is ready to be retrieved by the user or loaded into the user's vehicle, at block 373.

Then, the user drives his vehicle or goes to the pre-designated area to retrieve the local inaccessible product 221, at block 374. Preferably, the user or the order creation application 400 then directs the user's vehicle to the pre-designated area where the local inaccessible product 221 may be retrieved. The order creation application 400 may direct the user's vehicle using location information from the local or mobile device 200 and provides the user with turn-by-turn directions in response to the location information.

Moving to block 375, preferably the system or an employee determines that the user or the user's vehicle is at or near the pre-designated area, and the employee is notified of this at block 376. The determination that the user or the user's vehicle is at or near the pre-designated area may be made either automatically using sensors and/or computers, or manually by employees of the brick-and-mortar retail establishment using vehicle identifying information provided by the application 400.

Preferably, the system provides the employee with information regarding the order and the local inaccessible product 221 which needs to be moved from the staging area to the pre-designated area, at block 377. Then, the employee moved the local inaccessible product 221 from the staging area at block 378 and to the pre-designated area at block 380. Preferably, user identifying information or vehicle identifying information is provided to the employee, such as by displaying this information, at block 379. In one embodiment, the system uses location information in order to facilitate delivering of the local inaccessible product 221 to the user. Preferably, the location information details the present location of the user or the user's vehicle, and the retail establishment uses this location information to deliver the product 221 to the user.

Moving to block 381, upon moving the local inaccessible product 221 to the pre-designated area, the employee then confirms the order including the local inaccessible product 221 with the user, at block 381. Preferably, the system generates an order acceptance and liability waiver at block 382, and the user indicates acceptance of the order including the local inaccessible product 221 at block 383. The system then records the order and waiver acceptance at block 384 and the employee provides the order including the local inaccessible product 221 to the user or loads the order including the local inaccessible product 221 into the user's vehicle, at block 385. Preferably, the user then indicates deliver of the order including the local inaccessible product 221 at block 386, the system records this delivery at block 387, generates a receipt notification at block 388 and the load order is completed at block 389.

Preferably, in one embodiment, the application 400 provides the user with a pre-designated time for retrieving the local inaccessible product 221 at the pre-designated area. In another embodiment, the local device 200 automatically transmits or forwards arrival information to the retail establishment, preferably to a remote server in communication with the retail establishment. Preferably, the arrival information indicates when the user and/or the user's vehicle will arrive, or indicates that the user and or the user's vehicle have arrived, at the pre-designated area. Upon receiving the arrival information, the retail establishment or employee delivers the local inaccessible product 221 to the user or the user's vehicle using the arrival information.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation: or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a computer readable memory medium such as a magnetic medium like a hard disk drive, and solid state drive magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two component capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g. a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject mailer described herein. Furthermore, it is to be understood that the invention is defined by the appended claims. Accordingly, the invention is not to be restricted except in light of the appended claims and their equivalents.

The invention claimed is:

1. A system for enabling a user to purchase one or more products, the system comprising:
   a mobile electronic device of the user, the mobile electronic device of the user including:
   a display for displaying a graphical user interface configured to be displayed on the display and to permit the user to enter:
      a user-preselected order fulfillment method; and
      at least one payment method; and
   a scanning module for retrieving identification information for two or more different products sold by a retail establishment to be purchased by the user, wherein each product of the two or more different products is a different product type selected from a group of product types including: a local accessible product, a local inaccessible product, an online product, and a remote product;
   an electronic database configured to store electronic data representing product information associated with the different products sold by the retail establishment and electronic data representing the user-preselected order fulfillment method and the user-preselected at least one payment method associated with the products;
   a remote server in communication with the mobile electronic device of the user and the electronic database over a network,
      wherein in response to retrieval of the identification information at the local device by the scanning module, the local device automatically forwards the identification information to an order creation application,
      wherein the order creation application adds the products to a virtual shopping cart,
      wherein the remote server is configured to obtain the electronic data representing the user-preselected order fulfillment method and the user-preselected at least one payment method associated with the products in the virtual shopping cart, and generate, within the graphical user interface on the display of the mobile electronic device of the user, the virtual shopping cart, the virtual shopping cart including the user-preselected order fulfillment method and the user-preselected at least one payment method for the products in the virtual shopping cart; and
      wherein payment for all products in the virtual shopping cart is authorized;
   an order management system connected with the remote server, wherein the order management system processes an order for the product based on the virtual shopping cart; and
   an order fulfillment system connected with the order management system to fulfill the processed order.

2. The system of claim 1, wherein the products in the virtual shopping cart include a local accessible product, a local inaccessible product, and an online product.

3. The system of claim 1, wherein the order fulfillment methods comprises:
   delivering the product within the order to a location specified by the user;
   making the product within the order available for subsequent pick-up by the user;
   permitting the user to carry the product within the order out of the retail establishment;
   arranging for recurring delivery of the product within the order to the user specified location; and
   retrieving a local inaccessible product within the order from storage and delivering the local inaccessible product to a loading location where the product is loaded into a vehicle of the user.

4. The system of claim 1, wherein the payment method comprises: online account payment, credit card payment, debit card payment, money order payment, check payment, cash payment, government benefit payment, gift card payment, and travelers check payment.

5. A method for enabling a user to purchase one or more products, the method comprising:
   providing a mobile electronic device of the user, the mobile electronic device of the user including:
   a display for displaying a graphical user interface configured to be displayed on the display and to permit the user to enter:
      a user-preselected order fulfillment method; and
      at least one payment method; and
   a scanning module for retrieving identification information for two or more different products sold by a retail establishment to be purchased by the user, wherein each product of the two or more different products is a different product type selected from a group of product types including: a local accessible product, a local inaccessible product, an online product, and a remote product;
   providing an electronic database configured to store electronic data representing product information associated with the different products sold by the retail establishment and electronic data representing the user-preselected order fulfillment method and the user-preselected at least one payment method associated with the products;
   providing a remote server in communication with the mobile electronic device of the user and the electronic database over a network;
   in response to retrieval of the identification information at the local device by the scanning module, automatically forwarding, by the local device, the identification information to an order creation application;
   adding, by the order creation application, the products to a virtual shopping cart;
   obtaining, by the remote server, the electronic data representing the user-preselected order fulfillment method and the user-preselected at least one payment method associated with the products in the virtual shopping cart;

generating, within the graphical user interface on the display of the mobile electronic device of the user, the virtual shopping cart, the virtual shopping cart including the user-preselected order fulfillment method and the user-preselected at least one payment method for the products in the virtual shopping cart;

authorizing payment for all products in the virtual shopping cart;

providing an order management system connected with the remote server;

processing, by the order management system, an order for the product based on the virtual shopping cart; and providing an order fulfillment system connected with the order management system to fulfill the processed order.

6. The method of claim 5, wherein the products in the virtual shopping cart include a local accessible product, a local inaccessible product, and an online product.

7. The method of claim 5, wherein the order fulfillment methods comprises:
- delivering the product within the order to a location specified by the user;
- making the product within the order available for subsequent pick-up by the user;
- permitting the user to carry the product within the order out of the retail establishment;
- arranging for recurring delivery of the product within the order to the user specified location; and
- retrieving a local inaccessible product within the order from storage and delivering the local inaccessible product to a loading location where the product is loaded into a vehicle of the user.

8. The method of claim 5, wherein the payment method comprises: online account payment, credit card payment, debit card payment, money order payment, check payment, cash payment, government benefit payment, gift card payment, and travelers check payment.

* * * * *